(12) United States Patent
Saito et al.

(10) Patent No.: US 8,013,035 B2
(45) Date of Patent: Sep. 6, 2011

(54) RECORDING LIQUID, INK SET, METHOD FOR RECORDING AN IMAGE, IMAGE-RECORDING APPARATUS AND RECORDED MATTER

(75) Inventors: Ryo Saito, Kanagawa (JP); Terukazu Yanagi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 215 days.

(21) Appl. No.: 12/382,342

(22) Filed: Mar. 13, 2009

(65) Prior Publication Data

US 2009/0239996 A1 Sep. 24, 2009

(30) Foreign Application Priority Data

Mar. 21, 2008 (JP) ................................ 2008-073972

(51) Int. Cl.
*C09D 11/02* (2006.01)
(52) U.S. Cl. ........................................ 523/160; 523/161
(58) Field of Classification Search .................. 523/160, 523/161; 524/556, 560
See application file for complete search history.

(56) References Cited

U.S. PATENT DOCUMENTS

| 6,087,416 | A  | * | 7/2000  | Pearlstine et al. | ............ | 523/160 |
| 7,294,659 | B2 | * | 11/2007 | Yatake           | ............ | 523/160 |
| 7,655,707 | B2 | * | 2/2010  | Ma               | ............ | 523/160 |
| 7,803,852 | B2 | * | 9/2010  | Doi et al.       | ............ | 523/161 |
| 2003/0069329 | A1 | * | 4/2003 | Kubota et al.   | ............ | 523/160 |

FOREIGN PATENT DOCUMENTS

| JP | 2001081387 A | * | 3/2001 |
| JP | 2004-2715    |   | 1/2004 |
| JP | 2004-169008  |   | 6/2004 |
| JP | 2005041971 A | * | 2/2005 |

OTHER PUBLICATIONS

JP 2001081387 A, Mar. 2001, English Abstract.*
JP 2005041971 A, Feb. 2005, Derwent Abstract.*

* cited by examiner

*Primary Examiner* — Satya B Sastri
(74) *Attorney, Agent, or Firm* — Jean C. Edwards, Esq.; Edwards Neils PLLC

(57) ABSTRACT

A recording liquid is provided. The recording liquid includes particles A including a water-insoluble colorant and a compound containing a hydrophilic group, the particles A having a dispersion average particle diameter from 5 to 50 nm; and a self-dispersible polymer particles B including a constituent unit derived from an aromatic group-containing acrylate monomer.

9 Claims, No Drawings

RECORDING LIQUID, INK SET, METHOD FOR RECORDING AN IMAGE, IMAGE-RECORDING APPARATUS AND RECORDED MATTER

CROSS-REFERENCE TO RELATED APPLICATIONS

This application claims priority under 35 USC 119 from Japanese Patent Application No. 2008-073972, filed Mar. 21, 2008, the disclosure of which is incorporated by reference herein.

BACKGROUND OF THE INVENTION

1. Technical Field

The present invention relates to a recording liquid, an ink set, a method for recording an image, an image-recording apparatus and a recorded matter.

2. Description of the Related Art

In recent years, various methods have been proposed as a method for recording color images. Of these, ink-jet recording methods are capable of high-speed recording, have high freedom in drawing of patterns, produce less noise when recording, and have advantages such as that it is possible to record images at a low cost, easily perform color recording, and the like. Accordingly, ink-jet recording methods have become rapidly popular, and are still developing. Conventionally, as a recording liquid for an ink-jet recording method, dye inks formed by dissolving an aqueous dye in an aqueous medium have been widely used. Dye inks, however, result in poor water resistance and weather resistance of printed matter, and therefore, pigment inks capable of remedying these weakness have been investigated.

An ink for ink-jet recording has been disclosed that aims to improve color saturation, to obtain vividness of color tone, ejection stability and storage stability of the ink, and the like. In this ink, an average particle diameter ($D_{50}$) of pigment particles is 100 nm or less, the standard deviation of particle diameters in the particle size distribution of the pigment particles is one half or less of the average particle diameter, and the ink includes emulsion particles having an average particle diameter of 50 nm or less (for example, see Japanese Patent Application Laid-Open (JP-A) No. 2004-169008).

Further, an ink for ink-jet recording has been disclosed that aims to improve color saturation, and to obtain ejection stability and liquid stability, which includes a pigment dispersion liquid that includes pigments having an average particle diameter ($D_{50}$) of 50 nm or less (see, for example, JP-A No. 2004-2715).

SUMMARY OF THE INVENTION

However, in the inks for ink-jet recording described in JP-A No. 2004-169008 and in JP-A No. 2004-2715, stability over time of the ink is insufficient, and ejection stability of the ink is likely to decrease due to an increase in ink viscosity.

The present invention has been made in view of the above circumstances and provides a recording liquid, an ink set, a method for recording an image, an image-recording apparatus and a recorded matter.

According to a first aspect of the present invention, a recording liquid is provided. The recording liquid includes particles A including a water-insoluble colorant and a compound containing a hydrophilic group, the particles A having a dispersion average particle diameter from 5 to 50 nm; and self-dispersible polymer particles B including a constituent unit derived from an aromatic group-containing acrylate monomer.

According to a second aspect of the present invention, an ink set including the recording liquid according to the first aspect is provided.

According to a third aspect of the present invention, a method for recording an image is provided. The method includes, with the recording liquid of the first aspect or the recording set of the second aspect, ejecting the recording liquid by an ink-jet method to record an image.

According to a forth aspect of the present invention, an image-recording apparatus is provided. The image-recording apparatus includes an ejection unit that ejects the recording liquid according to the first aspect, or the recording liquid of the recording set of the second aspect, by an ink-jet method.

According to a fifth aspect of the present invention, a recorded matter recorded with the recording liquid of the first aspect or the ink set according of the second aspect is provided.

DETAILED DESCRIPTION OF THE INVENTION

Recording Liquid

The recording liquid of the present invention (hereinafter, occasionally referred to as the "ink") includes at least one kind of particles A including a water-insoluble colorant and a compound containing a hydrophilic group, the particles A having a dispersion average particle diameter of 5 to 50 nm, and at least one kind of a self-dispersible polymer particles B including a constituent unit derived from an aromatic group-containing acrylate monomer. With such constitution, it is possible to achieve good stability over time of the ink and also to lower the ink viscosity. In addition, it is possible to improve the scratching resistance of images recorded with the recording liquid.

[Particles A]

The particles A in the invention include at least one water-insoluble colorant, and at least one compound containing a hydrophilic group, and have a dispersion average particle diameter of 5 to 50 nm.

With the particles A having such constitution, it is possible to achieve good stability over time of the ink and to lower the ink viscosity.

As the water-insoluble colorant in the invention, those having such function as recording images by coloring may be used, and pigments, water-insoluble dyes and the like can be used.

No particular limitation is imposed on the compound containing a hydrophilic group, so long as it is a compound containing a hydrophilic group and capable of dispersing the particles A including a water-insoluble colorant in an aqueous medium. It may be either of a polymer dispersing agent and a low molecular weight dispersing agent. In the invention, from the standpoint of the viscosity of the recording liquid, a polymer dispersing agent is preferable.

As the particles A in the invention, either of a water-dispersible pigment and water-insoluble colorant particles including a dye may be usable. In the invention, from the standpoint of weather resistance of recorded images, the water-dispersible pigment is preferable.

(Water-Dispersible Pigment)

For the pigment used for the water-dispersible pigment in the invention, no particular limitation is imposed on the hue and structure thereof. Examples of the pigment include a perylene compound pigment, a perynone compound pigment, a quinacridone compound pigment, a quinacridone quinone compound pigment, an anthraquinone compound pigment, an anthoanthoron compound pigment, a benzimidazolone compound pigment, a disazo condensation compound pigment, a disazo compound pigment, an azo compound pigment, an indanthrone compound pigment, an indanthrene compound pigment, a quinophthalone compound pigment, a quinoxalinedione compound pigment, a metal complex azo compound pigment, a phthalocyanine compound pigment, a triarylcarbonium compound pigment, a dioxazine compound pigment, an aminoanthraquinone compound pigment, a diketopyrrolopyrrole compound pigment, a naphthol AS compound pigment, a thioindigo compound pigment, an isoindoline compound pigment, an isoindolinone compound pigment, a pyranthrone compound pigment, an isoviolanthrone compound pigment, mixtures thereof, and the like.

For more detail, examples of organic pigments contained in an yellow ink include C. I. Pigment Yellow 1 (Hanza Yellow), 2, 3 (Hanza Yellow 10G), 4, 5 (Hanza Yellow 5G), 6, 7, 10, 11, 12, 13, 14, 16, 17, 24 (Fravanthrone Yellow), 34, 35, 37, 53, 55, 65, 73, 74, 75, 81, 83, 93, 94, 95, 97, 98, 99, 108 (Anthrapyrimidine Yellow), 109, 110, 113, 117 (Cu complex salt pigment), 120, 124, 128, 129, 133 (quinophthalone), 138, 139 (isoindolinone), 147, 151, 153 (Ni complex pigment), 154, 155, 167, 172, 180 and the like.

These pigments may be used in one kind alone or in two kinds of more in mixture or in solid solution.

Among them, C.I. Pigment Yellow 128, C. I. Pigment Yellow 74, C.I. Pigment Yellow 110, Pigment Yellow 138, C. I. Pigment Yellow 151 and C. I. Pigment Yellow 155 are preferable from the stand point of the use in color printing, C. I. Pigment Yellow 128, C.I. Pigment Yellow 74, Pigment Yellow 138 and C. I. Pigment Yellow 155 are more preferable as a colorant having a preferable hue and high tinting strength, and C.I. Pigment Yellow 74 having a high tinting strength, a hue near to the hue of colorants for use in offset printing and the like is particularly preferable.

Examples of organic pigments for use in magenta inks include C. I. Pigment Red 1 (Para Red), 2, 3 (Toluidine Red), 4, 5 (ITR Red), 6, 7, 8, 9, 10, 11, 12, 14, 15, 16, 17, 18, 19, 21, 22, 23, 30, 31, 32, 37, 38 (Pyrazolone Red), 40, 41, 42, 48 (Ca), 48 (Mn), 57 (Ca), 57:1, 88 (thioindigo), 112 (Naphthol AS-based), 114 (Naphthol AS-based), 122 (dimethylquinacridone), 123, 144, 146, 149, 150, 166, 168 (Anthoanthoron Orange), 170 (Naphthol AS-based), 171, 175, 176, 177, 178, 179 (Perylene Maroon), 184, 185, 187, 202, 209 (dichloroquinacridone), 219, 224 (perylene-based), 245 (Naphthol AS-based), 254, C.I. Pigment Violet 19 (quinacridone), 23 (Dioxazine Violet), 32, 33, 36, 38, 43, 50 and the like.

These pigments may be used in one kind alone or in two kinds of more in mixture or in solid solution.

Among them, C. I. Pigment Red 122, C. I. Pigment Red 202, C. I. Pigment Red 254 and C.I. Pigment Violet 19 are preferable as a colorant having a preferable hue and high tinting strength, and C. I. Pigment Red 122 and C. I. Pigment Violet 19 having a high tinting strength and a hue near to the hue of colorants for use in offset printing and the like are particularly preferable.

Examples of organic pigments for use in cyan inks include C.I. Pigment Blue 1, 2, 3, 15, 15:1, 15:2, 15:3, 15:34, 15:4, 16 (metal-free phthalocyanine), 18 (Alkali Blue toner), 22, 25, 60 (Threne Blue), 65 (violanthrone), 66 (indigo), C. I. Vat Bleu 4, 60 and the like.

These pigments may be used in one kind alone or in two kinds of more in mixture or in solid solution.

Among them, Cu-phthalocyanine-based pigments are preferable as colorants having a preferable hue and high tinting strength, C. I. Pigment Blue 1, 2, 3, 15, 15:1, 15:2, 15:3, 15:34, 15:4 are more preferable, and C. I. Pigment Blue 15:3 and C.I. Pigment Blue 15:4 having a high tinting strength and a hue near to the hue of colorants for use in offset printing and the like are particularly preferable.

Examples of organic pigments for black include black organic pigments such as aniline Black (C. I. Pigment Black 1).

For the recording liquid of the invention, inorganic pigments may be used in place of organic pigments.

Examples of inorganic pigments usable for black include carbon blacks below, including, for example, No. 2300, No. 900, MCF88, No. 33, No. 40, No. 45, No. 52, MA7, MA8, MA100, No. 2200B and the like manufactured by Mitsubishi Chemical; RAVEN 5750, RAVEN 5250, RAVEN 5000, RAVEN 3500, RAVEN 1255, RAVEN 700 and the like manufactured by Columbian Chemicals; REGAL 400R, REGAL 330R, REGAL 660R, MOGUL L, MONARCH 700, MONARCH 800, MONARCH 880, MONARCH 900, MONARCH 1000, MONARCH 1100, MONARCH 1300, MONARCH 1400 and the like manufactured by Cabot Corporation; and Color Black FW1, Color Black FW2, Color Black FW2V, Color Black FW18, Color Black FW200, Color Black S150, Color Black S160, Color Black S170, PRINTEX 35, PRINTEX U, PRINTEX V, PRINTEX 140U, Special Black 6, Special Black 5, Special Black 4A, Special Black 4 and the like manufactured by Degussa.

Further, examples of organic pigments usable for color inks other than magenta, cyan or yellow ink include C. I. Pigment Green 7 (Phthalocyanine Green), 10 (Green Gold), 36, 37; C. I. Pigment Brown 3, 5, 25, 26; and C. I. Pigment Orange 1, 2, 5, 7, 13, 14, 15, 16, 24, 34, 36, 38, 40, 43, 63 and the like.

In the recording liquid according to the invention, the aforementioned pigments may be used in one kind, or in two or more kinds in combination. Further, for the purpose of obtaining a preferable hue, it may include a solid solution pigment including two or more kinds of pigments described above.

Specific examples of the water-dispersible pigment include the following pigments (1) to (5).

(1) Encapsulated pigment: that is, a polymer emulsion formed by incorporating a pigment in polymer particles. More specifically, the encapsulated pigment is formed by coating a pigment with a hydrophilic water-insoluble resin to hydrophilize the pigment by the resin layer on the pigment surface, and dispersing the coated pigment in water.

(2) Self-dispersible pigment: that is, a pigment that has at least one kind of hydrophilic group on the surface and exhibits at least either of water dispersibility or water solubility in the absence of a dispersing agent. More specifically, the self-dispersible pigment is formed by subjecting a pigment, for example, mainly carbon black and the like, to a surface oxidation treatment to hydrophilize, thereby making the pigment dispersible in water as a pigment single body.

(3) Resin-dispersed pigment: that is, a pigment dispersed by a water-soluble polymer compound having a weight-average molecular weight of 50,000 or less.

(4) Surfactant-dispersed pigment: that is, a pigment dispersed by a surfactant.

(5) Dispersed pigment produced by dissolving an organic pigment and a polymer dispersing agent, or a polymer compound as a dispersing agent in an aprotic organic solvent in the presence of an alkali, and then mixing the liquid with water to produce a pigment dispersion liquid (hereinafter, the dispersed pigment produced by the method is described as "the built-up pigment").

Preferable examples as the water-dispersible pigment in the invention include the (1) encapsulated pigment, the (2) self-dispersible pigment, and the (5) built-up pigment. Particularly preferable examples can include the (1) encapsulated pigment and the (5) built-up pigment.

Further, for the purpose of obtaining a dispersion liquid of the aforementioned water-insoluble colorant particle having a dispersion average particle diameter of 5 to 50 nm, the (5) built-up pigment is preferably used.

The (5) built-up pigment is preferable, since when the built-up pigment is used, it is possible to obtain particles having a small particle diameter and being monodispersed, and, further, it is possible to obtain a pigment dispersion liquid having a very small amount of coarse particles or coarse secondary aggregates (which means the aggregates of primary particles). In addition, the (5) built-up pigment is preferable since it may exhibit excellent light resistance as compared with the (1) to (4), although the reasons thereof are unclear.

The encapsulated pigment will be described in detail. A resin for use in the encapsulated pigment is not limited, but it is preferably a polymer compound having a self-dispersion capability or dissolution capability in a mixed solvent of water and a water-soluble organic solvent, and having an anionic group (acidic group).

The resin preferably has a number average molecular weight in the range of around 1,000 to 100,000, and more preferably a number average molecular weight in the range of around 3,000 to 50,000, from the standpoint of obtaining fine pigment particles and dispersion stability. Further, a resin that dissolves in an organic solvent to form a solution is preferable.

When the resin has the number average molecular weight in this range, it can sufficiently exert functions as a coating film for pigments, or as a coating film in inks. The resin is preferably used in a form of a salt of alkali metal or organic amine.

Specific examples of resins for the encapsulated pigment include materials having an anionic group such as thermoplastic, thermo-curable, or modified acrylic-based, epoxy-based, polyurethane-based, polyether-based, polyamide-based, unsaturated polyester-based, phenol-based, silicone-based and fluorine-containing polymer compounds; polyvinyl-based resins such as vinyl chloride, vinyl acetate, polyvinyl alcohol and polyvinyl butyral; polyester-based resins such as alkyd resin and phthalic resin; amino-based materials such as melamine resin, melamine-formaldehyde resin, aminoalkyd co-condensed resin and urea resin; and copolymers and mixtures thereof.

Among these resins, the anionic acrylic-based resin can be obtained, for example, by polymerizing an acrylic monomer having an anionic group (hereinafter, referred to as an anionic group-containing acrylic monomer), and, further, another monomer copolymerizable with these monomers, according to need, in a solvent.

Examples of anionic group-containing acrylic monomers include acrylic monomers having one or more anionic groups selected from the group consisting of a carboxyl group, a sulfonic acid group and a phosphonic acid group. Among these, acrylic monomers having a carboxyl group are particularly preferable.

Specific examples of acrylic monomers having a carboxyl group include acrylic acid, methacrylic acid, crotonic acid, ethacrylic acid, propylacrylic acid, isopropylacrylic acid, itaconic acid, fumaric acid and the like. Among these, acrylic acid and methacrylic acid are preferable.

The encapsulated pigment can be manufactured by a conventional physical method or a chemical method with the use of the aforementioned components. In the invention, the encapsulated pigment is preferably manufactured by any of the methods disclosed in JP-A Nos. 9-151342, 10-140065, 11-209672, 11-172180, 10-25440 or 11-43636.

In the invention, the self-dispersible pigment may also be mentioned as a preferable example. The self-dispersible pigment is a pigment formed by bonding many hydrophilic functional groups and/or salts thereof (hereinafter, referred to as a dispersibility-providing group) to the surface of a pigment directly or indirectly via an alkyl group, an alkylether group, aryl group or the like to be made dispersible in an aqueous medium without a dispersing agent.

Here, the phrase "dispersible in an aqueous medium without a dispersing agent" means that dispersion in an aqueous medium can be achieved even when a dispersing agent for dispersing the pigment is not used.

An ink that contains the self-dispersible pigment as a colorant is not required to contain a dispersing agent which is used for ordinary pigments as described above, and, therefore, it is possible to easily prepare an ink in which foam formation due to the lowering of defoaming property caused by the dispersing agent scarcely occurs, and which is excellent in ejection stability.

Examples of dispersibility-providing group, which is bonded to the surface of the pigment self-dispersible, include —COOH, —CO, —OH, —$SO_3H$, —$PO_3H_2$ and quaternary ammonium, and salts thereof.

The self-dispersible pigments containing at least one of these dispersibility-providing groups or active species having the dispersibility-providing group are manufactured by subjecting a pigment that is a raw material to a physical treatment or a chemical treatment, thereby bonding (grafting) the dispersibility-providing group or the active species having the dispersibility-providing group to the surface of the pigment.

Examples of the physical treatment include a vacuum plasma treatment and the like. Examples of the chemical treatment include a wet oxidation method in which the pigment surface is oxidized with an oxidant in water, and a method in which p-aminobenzoic acid is bonded to the surface of a pigment, thereby bonding a carboxyl group via a phenyl group to the pigment.

In the invention, preferable examples of the self-dispersible pigment include self-dispersible pigments that are surface-treated by an oxidation treatment with hypohalous acid and/or a hypohalous acid salt, or an oxidation treatment with ozone.

As the self-dispersible pigments, commercially available products may be used. Examples thereof include MICROJET CW-1 (trade name; manufactured by Orient Chemical Industries), and CAB-O-JET200 and CAB-O-JET300 (trade names; manufactured by CABOT Corporation).

As dispersing agents that may be used in the (1) encapsulated pigment or (3) resin-dispersed pigment in the invention, nonionic compounds, anionic compounds, cationic compounds, amphoteric compounds and the like can be mentioned as examples thereof.

For example, copolymers of a monomer having an α,β-ethylenically unsaturated group are mentioned. Examples of a monomer having an α,β-ethylenically unsaturated group include ethylene, propylene, butene, pentene, hexene, vinyl acetate, allyl acetate, acrylic acid, methacrylic acid, crotonic acid, crotonic acid ester, itaconic acid, itaconic acid monoester, maleic acid, maleic acid monoester, maleic acid diester, fumaric acid, fumaric acid monoester, vinylsulfonic acid, styrenesulfonic acid, sulfonated vinylnaphthalene, vinyl alcohol, acrylamide, methacryloxyethyl phosphate, bis-methacryloxyethyl phosphate, methacryloxyethylphenyl acid phosphate, ethylene glycol dimethacrylate, diethylene glycol dimethacrylate, styrene, styrene derivatives such as α-methylstyrene and vinyl toluene, vinyl cyclohexane, vinyl naphthalene, vinyl naphthalene derivatives, acrylic acid alkyl ester that may be substituted by an aromatic group, acrylic acid phenyl ester, methacrylic acid alkyl ester that may be substituted by an aromatic group, methacrylic acid phenyl ester, methacrylic acid cycloalkyl ester, crotonic acid alkyl ester, itaconic acid dialkyl ester, maleic acid dialkyl ester, vinyl alcohol, derivatives of aforementioned compounds, and the like.

Homopolymers of the monomer having an α,β-ethylenically unsaturated group or copolymers obtained by copolymerizing plural kinds of monomers having an α,β-ethylenically unsaturated group may be used as a polymer dispersing agent. Specific examples thereof include acrylic acid alkyl ester-acrylic acid copolymer, methacrylic acid alkyl ester-methacrylic acid copolymer, styrene-acrylic acid alkyl ester-acrylic acid copolymer, styrene-methacrylic acid phenyl ester-methacrylic acid copolymer, styrene-methacrylic acid cyclohexyl ester-methacrylic acid copolymer, styrene-styrene sulfonic acid copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, polystyrene, polyester, polyvinyl alcohol and the like.

The dispersing agent preferably has a weight-average molecular weight of 2,000 to 60,000. Here, the weight average molecular weight is an average molecular weight measured by gel permeation chromatography (carrier: tetrahydrofuran) and shown in terms of polystyrene, unless specified otherwise.

The ratio of the addition amount of the dispersing agent relative to the pigment is preferably in the range from 10% to 100% by mass, more preferably from 20% to 70% by mass, furthermore preferably from 40% to 50% by mass, from the standpoint of the stability of pigment dispersion.

Next, the built-up pigment will be described in detail.

The built-up pigment can be manufactured by a method including the following processes (1) to (3), or a method further including the following processes (4) and (5), in a solid form or in a dispersed form.

The built-up pigment in the invention may preferably be manufactured by the processes of:

(1) forming a solution by dissolving a water-insoluble colorant (organic pigment) and a dispersing agent in an aprotic water-soluble organic solvent in the presence of an alkali;

(2) mixing the solution with a water-based medium to obtain a dispersion composition formed by dispersing the particle of the water-insoluble colorant and the dispersing agent in a medium containing water;

(3) forming a soft aggregate in which particles of the water-insoluble colorant are aggregated in a re-dispersible state and separating the soft aggregate from the dispersion composition;

(4) filtrating and washing the soft aggregate with an ester-based solvent or a ketone-based solvent; and (5) loosening the soft aggregate to be re-dispersed in a redispersion medium.

Regarding the aprotic solvent in the invention, any solvents may be used so long as they dissolve the organic pigment and the polymer compound in the presence of an alkali. Among them, ones having a solubility of 5% by mass or more relative to water are preferably used, and ones that mix freely with water is more preferable.

Specifically, examples of preferable solvents include dimethylsulfoxide, dimethylimidazolidinone, sulfolane, N-methylpyrrolidone, dimethylformamide, acetonitrile, acetone, dioxane, tetramethyl urea, hexamethylphosphoramide, hexamethylphosphorotriamide, pyridine, propionitrile, butanone, cyclohexanone, tetrahydrofuran, tetrahydropyran, ethylene glycol diacetate, γ-butyrolactone and the like. Among them, dimethylsulfoxide, N-methylpyrrolidone, dimethylformamide, dimethylimidazolidinone, sulfolane, acetone, acetonitrile and tetrahydrofuran are preferable. They may be used in one kind alone or in two or more kinds in combination.

No particular limitation is imposed on the ratio of the aprotic solvent used, but, for the purpose of achieving better dissolution state of the pigment, easier formation of an intended fine particle diameter and better color density of the aqueous dispersion composition, the solvent is used preferably in a range from 2 to 500 parts by mass relative to 1 part by mass of the pigment, and more preferably in a range from 5 to 100 parts by mass relative to 1 part by mass of the pigment.

As an alkali to be incorporated in the aprotic solvent, examples thereof include inorganic bases such as sodium hydroxide, calcium hydroxide and barium hydroxide, and organic bases such as trialkylamine, diazabicycloundecene (DBU) and metal alkoxide. Among these, the use of an inorganic base is preferable. No particular limitation is imposed on the amount of the alkali to be incorporated. In the case of the inorganic base, it is preferably from 1.0 to 30 molar equivalents relative to the pigment, more preferably from 2.0 to 25 molar equivalents, particularly preferably from 3 to 20 molar equivalents. In the case of organic bases, it is preferably from 1.0 to 100 molar equivalents relative to the pigment, more preferably from 5.0 to 100 molar equivalents, and particularly preferably from 20 to 100 molar equivalents.

In the invention, a water-based solvent means water alone or a mixed solvent of water and a water-soluble organic solvent(s). The organic solvent is preferably added in such cases that water alone is insufficient for uniformly dissolving the pigment and the dispersing agent, or water alone is insufficient for obtaining a viscosity necessary for flowing in flow channels, or the like. In alkaline cases, such organic solvents as amide-based solvents and sulfur-containing solvents are preferable, sulfur-containing solvents are more preferable, and dimethylsulfoxide (DMSO) is particularly preferable. In acidic cases, carboxylic acid-based solvents, sulfur-containing solvents and sulfonic acid-based solvents are preferable, sulfonic acid-based solvents are more preferable, and methane sulfonic acid is particularly preferable. To the water-based solvent, a salt of inorganic compound, a dispersing agent described later or the like may be dissolved according to need.

In the process (2) above, the method of mixing a solution in which a water-insoluble colorant is uniformly dissolved with a water-based solvent is not particularly limited. Examples of the method include: a method in which the water-based solvent is stirred and thereto, a solution of the water-insoluble colorant is added; and a method in which both the solution and the water-based solvent are supplied into a flow channel having a certain length in the same longitudinal direction, and allowing both liquids to contact with each other during passing through the flow channel to precipitate fine particles of the organic pigment. For the former (the method of stirring and mixing), in particular, a method using submerged addition in which the solution of a water-insoluble colorant is added through a supply pipe or the like which has been introduced into the water-based solvent is preferable. More specifically, the submerged addition can be performed using an apparatus described in WO 2006/121018, paragraphs 0036 to 0047. For the latter (the method of mixing the both (the solution and the water-based solvent) using a flow channel), for example, a microreactor described in JP-A No. 2005-307154, paragraphs 0049 to 0052 and FIGS. 1 to 4, or JP-A No. 2007-39643, paragraphs 0044 to 0050 can be used.

No particular limitation is imposed on the conditions for precipitating and generating particles of the water-insoluble colorant, and a condition in a range from ordinary pressure to subcritical pressure or supercritical pressure can be selected. The temperature under ordinary pressure is preferably from −30 to 100° C., more preferably from −10 to 60° C., and particularly preferably from 0 to 30° C. The mixing ratio of the solution of the water-insoluble colorant to the water-based solvent (solution of the water-insoluble colorant/water-based solvent) is preferably from 1/50 to 2/3 in volume ratio, more preferably from 1/40 to 1/2, and particularly preferably from 1/20 to 3/8. No particular limitation is also imposed on the particle concentration in the mixed liquid when particles are precipitated. The particle of the water-insoluble colorant is preferably in the range from 10 to 40000 mg relative to 1000 ml of the solvent, more preferably in the range from 20 to 30000 mg, and particularly preferably in the range from 50 to 25000 mg.

In the preparation of the built-up pigment, as the dispersing agent, a dispersing agent that is soluble in an aprotic organic solvent in the presence of an alkali and can give a dispersion effect by forming pigment-containing particles in the water-based solvent when mixing the solution in which the water-insoluble colorant and the dispersing agent are dissolved with the water-based solvent, may be suitably usable.

The dispersing agent is preferably a surfactant or a polymer compound which includes a hydrophilic portion containing one or more of a carboxylic acid group, a sulfonic acid group, a phosphoric acid group, a hydroxyl group and alkylene oxide.

The dispersing agent is more preferably a dispersing agent that stably dissolves in the aprotic organic solvent along with the organic pigment in the presence of alkali. When the hydrophilic portion of the dispersing agent include only group(s) other than those described as above, such as a primary, secondary or tertiary amino group, or a quaternary ammonium group, the degree of dispersion stability may occasionally be relatively decreased in an alkali-containing aqueous dispersion composition of an organic pigment, although the degree is sufficient.

In conventional methods for dispersing pigments, measures such as selecting a dispersing agent capable of efficiently contacting with a pigment surface in a dispersion state in a medium are required. In contrast, in the method for preparing the built-up pigment in the invention, since both a dispersing agent and a pigment exist in a dissolved state in a medium to allow an intended action between these to be obtained easily, no limitation is imposed on the dispersing agent based on the contact efficiency to the pigment surface, as compared with conventional pigment dispersion methods. Therefore wide-ranging dispersing agents can be used.

The surfactant can suitably be selected from publicly known surfactants and derivatives thereof, including, specifically, anionic surfactants such as alkyl benzene sulfonate, alkyl naphthalene sulfonate, higher fatty acid salts, higher fatty acid ester sulfonate, sulfuric acid ester salts of higher alcohol ether, higher alcohol ether sulfonate, higher alkyl sulfonamide alkylcarboxylate and alkylphosphate; nonionic surfactants such as polyoxyethylene alkyl ether, polyoxyethylene alkyl phenyl ether, polyoxyethylene fatty acid ester, sorbitan fatty acid ester, ethylene oxide adduct of acetylene glycol, ethylene oxide adduct of glycerin and polyoxyethylene sorbitan fatty acid ester; amphoteric surfactants such as alkylbetaine and amidobetaine; silicon-containing surfactants and fluorine-containing surfactants.

Specific examples of the polymer dispersing agent include polyvinyl pyrrolidone, polyvinyl alcohol, polyvinyl methyl ether, polyethylene oxide, polyethylene glycol, polypropylene glycol, polyacrylamide and the like, and, among them, the use of polyvinyl pyrrolidone is preferable.

In addition, examples of other polymer compounds which may be used as the dispersing agent include block copolymers, random copolymers, graft copolymers, modified products thereof, salts thereof and the like constituted of at least two monomers (at least one of them is a monomer having a functional group selected from the group consisting of a carboxylic acid group, a sulfonic acid group, a phosphoric acid group, a hydroxyl group and an alkylene oxide) selected from styrene, styrene derivatives, vinylnaphthalene, vinylnaphthalene derivatives, aliphatic alcohol ester and the like of $\alpha,\beta$-ethylenically unsaturated carboxylic acid, acrylic acid, acrylic acid derivatives, methacrylic acid, methacrylic acid derivatives, maleic acid, maleic acid derivatives, alkenyl sulfonic acid, vinylamine, allylamine, itaconic acid, itaconic acid derivatives, fumaric acid, fumaric acid derivatives, vinyl acetate, vinyl phosphonic acid, vinyl pyrrolidone, acrylamide, N-vinyl acetamide, N-vinyl formamide and derivatives thereof, and the like.

In more detail, the polymer compound in the invention is preferably configured to have a hydrophilic portion and a hydrophobic portion, and the use of a copolymer formed by copolymerizing a hydrophilic monomer component and a hydrophobic monomer component is preferable. When a polymer compound constituted of a hydrophobic monomer component alone is used, occasionally it may be difficult to give good dispersion stability to the water-insoluble colorant. Meanwhile, the hydrophilicity is a property of large affinity to water, which results in easy solubility in water, and hydrophobicity is a property of small affinity to water, which results in poor solubility in water.

Examples of the hydrophobic monomer component include monomer components having a hydrophobic unit such as an isobutyl group, a t-butyl group, a phenyl group, a biphenyl group or a naphthyl group as a structural unit. From the standpoint of giving high dispersion stability to the water-insoluble colorant, a block segment having a hydrophobic monomer such as styrene and t-butyl methacrylate as a repeating unit is preferable, but the hydrophobic monomer component is not limited to this.

Examples of the hydrophilic monomer component favorably include a monomer component containing a hydrophilic unit, as a unit structure, such as a structure having a functional group such as a carboxyl group, a sulfonic acid group, a phosphoric acid group, a hydroxyl group or an alkylene oxide. Among them, from the standpoint of improving the dispersion stability based on the charge repulsion effect between particles, it is preferable to have a carboxyl group, a sulfonic acid group or a phosphoric acid group as a unit structure. From the standpoint of improving long-term stability of a dispersion liquid and the image-fixing property when used as an ink, in particular, having a carboxyl group as a unit structure is preferable.

Specific examples of the hydrophilic monomer component include acrylic acid, methacrylic acid, carboxylic acid salts such as inorganic salts and organic salts of acrylic acid or methacrylic acid, polyethylene glycol macromonomer, vinyl alcohol, 2-hydroxyethyl methacrylate and the like, but the hydrophilic monomer component is not limited to them.

The aforementioned copolymer may be a copolymer having any form of block copolymer, random copolymer, graft copolymer and the like. In particular, the use of block copolymer or graft copolymer is preferable because it easily gives good dispersibility to the water-insoluble colorant.

Examples of other polymer compounds which may be used as the dispersing agent include natural polymer compounds such as albumin, gelatin, rosin, shellac, starch, gum arabic and sodium alginate, and modified products thereof.

These dispersing agents may be used in one kind alone or in two or more kinds in combination.

No particular limitation is imposed on the use ratio of the dispersing agent, but it is preferably used in a range from 0.05 parts by mass or more relative to 1 part by mass of the water-insoluble colorant (particularly, organic pigment), and 50 parts by mass or less relative to 100 parts by mass of the aprotic organic solvent.

When the dispersing agent is more than 50 parts by mass relative to 100 parts by mass of the aprotic organic solvent, it may be occasionally difficult to completely dissolve the dispersing agent, and, when it is less than 0.05 parts by mass relative to 1 part by mass the organic pigment, it may be occasionally difficult to obtain a sufficient dispersion effect.

In the ink of the invention, when taking the improvement of weather resistance into consideration, the aforementioned dispersing agents may favorably be used. But, from the standpoint of further improving the weather resistance and maintaining a low viscosity even when the concentration of the dispersion composition is made high, the use of a polymer dispersing agent or polymer compound that is soluble or dispersible in a specified organic solvent, which is used for a washing treatment described later, is particularly preferable.

No particular limitation is imposed on the molecular weight of the polymer dispersing agent or the polymer compound, but the weight-average molecular weight thereof is preferably from 500 to 1,000,000, more preferably from 1,000 to 1,000,000. When the weight-average molecular weight is less than 500, it is too small, and the weight-average molecular weight exceeding 1,000,000 may result in too much entanglement between polymer chains, therefore it may be difficult to exert the function as the dispersing agent, and, occasionally good dispersion state may not be maintained.

Meanwhile, the term "dispersion composition" means a composition in which predetermined fine particles are dispersed, wherein no limitation is imposed on the form thereof, the dispersion composition may be, for example, a liquid composition (dispersion liquid), a paste-like composition, a solid composition or the like.

The amount of the dispersing agent to be incorporated in a solution in which the water-insoluble colorant dissolves is, in order to further improve uniform dispersibility of pigments and storage stability, preferably in a range from 0.1 to 1000 parts by mass relative to 100 parts by mass of a pigment, more preferably in a range from 1 to 500 parts by mass, and particularly preferably in a range from 10 to 250 parts by mass. When the content of the dispersing agent is not less than a certain amount, the dispersion stability of organic pigment fine particles may be further improved. In the invention, no particular limitation is imposed on the amount of the dispersing agent contained in the dispersion composition, but from 10 to 1000 parts by mass relative to 100 parts by mass of pigment is practical.

In the above-described dispersion composition, as described specifically below, it is preferable to subject a mixed liquid formed by precipitating water-insoluble colorant particles to acid treatment, preferably to a treatment in which an acid is added when forming an aggregate, to allow the aggregate of particles to be formed.

The treatment using an acid preferably includes processes of aggregating particles with the acid, separating the same from a solvent (dispersion medium), concentrating the same, and removing the solvent and salt (acid). By making the system acidic, electrostatic repulsion by the acidic hydrophilic portion is lowered to allow particles to be aggregated.

As the acid to be used here, any one may be used so long as it can form aggregates of particles that are difficult to be precipitated, and can effectively separate the aggregates from the solvent in a state of slurry, paste, powder, particle, cake (lump), sheet, short fiber or flake.

Furthermore preferably, the utilization of an acid capable of forming a water-soluble salt with alkali is favorable, wherein it is preferable that the acid itself has a high solubility in water. In order to effectively remove the salt, the amount of the acid to be added is favorably as small as possible within a range that makes the aggregation of particles possible.

Specific examples thereof include hydrochloric acid, sulfuric acid, nitric acid, acetic acid, phosphoric acid, trifluoroacetic acid, dichloroacetic acid, methanesulfonic acid and the like, and, among these, hydrochloric acid, acetic acid and sulfuric acid are particularly preferable. The aqueous dispersion liquid of pigment particles formed in an easily separable state by acid can easily be separated with a centrifugal separator, a filtration apparatus, a slurry solid-liquid separator and the like. On this occasion, the degree of removing the salt and solvent can be controlled by adding dilution water or increasing the repetition number of decantation and washing.

The aggregate obtained here may be used directly as paste or slurry with a high water content, or may be used as fine powder after being subjected to such drying method as a spray dry method, a centrifugal drying method, a filtration drying method, or a freeze-drying method, according to need.

In the aqueous dispersion composition, the water-insoluble colorant has a crystalline structure. In order to form the crystalline structure, the soft aggregate of particles are preferably contacted with an organic solvent.

As the organic solvent, ester-based solvents, ketone-based solvents, alcohol-based solvents, aromatic-based solvents and aliphatic-based solvents are preferable, ester-based solvents and ketone-based solvents are more preferable, and ester-based solvents are particularly preferable.

Examples of the ester-based solvent include ethyl acetate, ethyl lactate, 2-(1-methoxy)propyl acetate and the like. Examples of the ketone-based solvent include acetone, methyl ethyl ketone, methyl isobutyl ketone, cyclohexanone and the like. Examples of the alcohol-based solvent include methanol, ethanol, n-butanol and the like. Examples of the aromatic-based solvent include benzene, toluene, xylene and the like. Examples of the aliphatic-based solvent include n-hexane, cyclohexane and the like. Ethyl acetate, acetone and ethyl lactate are preferable, and, among these, acetone and ethyl lactate are particularly preferable.

Although no particular limitation is imposed on the use amount of the organic solvent, for example, the use of from 0.01 to 10000 parts by mass relative to 100 parts by mass of pigment is preferable. Although no particular limitation is imposed on the amount of the organic solvent contained in the aqueous dispersion composition in the invention, from 0.0001 to 1% by mass is practical.

Although no particular limitation is imposed on a method for contacting the obtained aggregate with the organic solvent, a method that allows the aggregate to be separated from the organic solvent after the contact is preferable. Further, a method that allows the organic solvent to be separated while keeping a liquid state is preferable. For example, filtration with a filter is preferable.

Although the reason is not definite, by performing the contact treatment by the organic solvent, the crystallite diameter can be increased without increasing the particle diameter of a water-insoluble colorant particle contained in the dispersion composition.

In other words, the crystallinity of the water-insoluble colorant particle can be enhanced while maintaining the primary particle diameter of particles at precipitation. Furthermore, in a re-dispersion treatment described later, it is possible to re-disperse in water or the like while maintaining the primary particle diameter of particles at the precipitation, consequently, it is possible to maintain high dispersion stability. Further, by performing the above treatment, a low viscosity can be maintained even when the re-dispersion composition obtained by re-dispersion of aggregates has an increased concentration. Furthermore, when it is used as a recording liquid for ink-jet printing, it has good ejection properties.

It is supposed that these effects are expressed, for example, caused by liberating and removing an excessive dispersing agent contained in the dispersion composition by contacting the dispersion composition with the organic solvent and then separating them.

On this occasion, the dispersing agent lying near the surface of the water-insoluble colorant particle in the dispersion composition is strongly fixed to the water-insoluble colorant particle and thus the particle diameter of the water-insoluble colorant particle does not increase, and, therefore, high dispersion stability is maintained while keeping the primary particle diameter at the precipitation of particles, even after the re-dispersion treatment as described later.

For the dispersion composition, further re-dispersing the aggregate is preferable. As the re-dispersion treatment, an alkali treatment can be mentioned.

That is, it is preferable that particles having been aggregated using acid are neutralized with alkali and re-dispersed in water or the like with the primary particle diameter at the precipitation of the particle. Since the salt and solvent have already been removed, a concentrated base containing a little impurity can be obtained.

Any alkali may be used here so long as it acts as a neutralizing agent for the dispersing agent having an acidic hydrophilic portion to enhance the solubility in water.

Specific examples thereof include various kinds of organic amines such as aminomethyl propanol, dimethylamino propanol, dimethylethanolamine, diethyltriamine, monoethanolamine, diethanolamine, triethanolamine, butyldiethanolamine and morpholine, alkali metal hydroxides such as sodium hydroxide, lithium hydroxide and potassium hydroxide, and ammonia. These may be used in one kind or in two or more kinds in combination.

No particular limitation is imposed on the use amount of the alkali so long as it is within a range that can stably re-disperse aggregated particles in water, but, since the alkali may cause corrosion of various members when the re-dispersed composition is used for such applications as printing inks and inks for ink-jet printing, the use of an amount that gives a pH of 6 to 12 is preferable, and an amount that gives a pH of 7 to 11 is more preferable.

Further, depending on the dispersing agent used at precipitating particles, a method that differs from the alkali treatment may be employed.

Examples thereof include a re-dispersion treatment using the aforementioned low molecular weight dispersing agent or a polymer dispersing agent. On this occasion, publicly known means for dispersion treatment may be employed, and, for example, a dispersing machine such as a sand mill, a bead mill, a ball mill and dissolver, or ultrasonic treatment may be used. These re-dispersion treatment may be used in combination with the aforementioned alkali treatment.

When the aggregated particles are re-dispersed, it is also possible to add a water-soluble organic solvent as a medium for the re-dispersion, so that the particles can be easily re-dispersed.

No particular limitation is imposed on the organic solvent which may be used. Examples thereof include lower alcohols such as methanol, ethanol, n-propanol, isopropanol, n-butanol, isobutanol and tert-butanol; aliphatic ketones such as acetone, methyl ethyl ketone, methyl isobutyl ketone and diacetone alcohol; ethylene glycol, diethylene glycol, triethylene glycol, glycerin, propylene glycol, ethylene glycol monomethyl or monoethyl ether, propylene glycol methyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, N-methylpyrrolidone, 2-pyrrolidone, dimethylformamide, dimethylimidazolidinone, dimethylsulfoxide, dimethylacetamide and the like. These may be used in one kind or in two or more kinds in combination.

When re-dispersing pigment particles to form an aqueous dispersion liquid, the amount of water here is preferably from 99 to 20% by mass, and more preferably from 95 to 30% by mass. The amount of the water-soluble organic solvent is preferably from 50 to 0.1% by mass, and more preferably from 30 to 0.05% by mass.

When adding water, the above-described alkali and a water-soluble organic solvent to the aggregated particles, according to need, a stirring, mixing or dispersing apparatus may be used. When using a paste or slurry of an organic pigment which has a particularly high water content, no water may be added.

Further, for the purpose of improving the efficiency of re-dispersion and removing a water-soluble organic solvent having become useless, an excessive alkali and the like, heating, cooling, distillation or the like may be performed.

(Water-Insoluble Colorant Particles Including Dye)

As one embodiment of water-insoluble colorant particles including a dye in the invention, resin particles including a dye as a colorant can be mentioned. Such water-insoluble colorant particles may be obtained by, for example, a method including dissolving or dispersing a resin (plural resins may be used) and a dye described below in an organic solvent, emulsifying the product in water, and then removing the organic solvent. Alternatively, the particles can be obtained by any of various methods, for example, a method in which a resin fine particle aqueous dispersion composition is previously formed by an emulsion polymerization, and then, to the resin fine particle aqueous dispersion composition, an organic solvent solution in which a dye is dissolved is mixed to impregnate the dye into the resin fine particle, and the like.

<<Resin>>

As a resin used for water-insoluble colorant particles including a dye, generally known resins (polymer) can be employed, and, as a preferable resin (polymer), a polymer obtained by radical polymerization of a vinyl monomer having a polymerizable ethylenically unsaturated double bond is preferably used.

As the polymer obtained by radical polymerization of a vinyl monomer having a polymerizable ethylenically unsaturated double bond, for example, a polymer of acrylic acid ester, copolymers such as styrene-acrylic acid ester, vinyl acetate-acrylic acid and the like may be preferable.

Examples of specific monomers that give the aforementioned polymer include vinyl acetate, methyl acrylate, ethyl acrylate, n-butyl acrylate, t-butyl acrylate, 2-ethylhexyl acrylate, isononyl acrylate, dodecyl acrylate, octadecyl acrylate, 2-phenoxyethyl acrylate, methyl methacrylate, ethyl methacrylate, n-butyl methacrylate, isobutyl methacrylate, 2-ethylhexyl methacrylate, 2-hydroxethyl methacrylate, dodecyl methacrylate, octadecyl methacrylate, cyclohexyl methacrylate, stearyl methacrylate, benzyl methacrylate, glycidyl methacrylate, phenyl methacrylate, styrene, α-methylstyrene, acrylonitrile and the like, acetoacetoxyethyl methacrylate, and a soybean fatty acid-modified product of glycidyl methacrylate (BLEMMER G-FA: manufactured by NOF), and the like.

When combining any of the aforementioned monomers, a solubility parameter (SP value) of preferably from 16 to 20 $(MPa)^{1/2}$ and a weight average molecular weight of preferably from 2,000 to 50,000, and more preferably from 2,000 to 30,000 may be obtained, thereby giving the water-insoluble colorant particle in the invention.

Examples of resins of a more preferable combination include a copolymer formed by adding, to styrene or methyl methacrylate as a main component, at least one kind selected from acetoacetoxyethyl methacrylate, a soybean fatty acid-modified product of glycidyl methacrylate (BLEMMER G-FA: manufactured by NOF) and a long chain (meth)acrylic acid ester such as n-butyl acrylate, stearyl methacrylate and 2-ethylhexyl acrylate, and, further for the purpose of improving physical properties, acrylonitrile, divinyl benzene, diethylene glycol dimethacrylate or the like according to need.

The aforementioned polymer may have a substituent, and the substituent may have a linear, branched, or cyclic structure. As the polymer having the aforementioned functional group, various kinds thereof are available commercially, or it can also be synthesized according to an ordinary method. Further, these copolymers can also be obtained, for example, by introducing an epoxy group into one polymer molecule, and, then, by allowing it to be condensation-polymerized with another polymer or graft-polymerized using light or a radiation ray.

(Weight Average Molecular Weight of Resin)

The weight average molecular weight of the resin in the invention us preferably in the range from 2,000 to 50,000. It is more preferably from 2,000 to 30,000, and particularly preferably from 2,000 to 15,000.

<<Dye>>

Regarding the hue of dyes employed in the invention, yellow, magenta, cyan, black, blue, green and red are used preferably, and dyes having yellow, magenta, cyan or black are particularly preferable. The oil-soluble dye is a dye, usually, that has no water-soluble group such as a carboxylic acid or a sulfonic acid and is soluble in an organic solvent and insoluble in water. The oil-soluble dye may be a day that is prepared by forming a salt of a water-soluble dye and a long-chain base to express an oil-solubility (salt-forming dye). For example, salt-forming dyes of an acid dye, a direct dye or a reactive dye with a long-chain amine are known.

Although not limited to dyes below, particularly preferable specific examples of the oil-soluble dye include VALIFAST YELLOW 4120, VALIFAST YELLOW 3150, VALIFAST YELLOW 3108, VALIFAST YELLOW 2310N, VALIFAST YELLOW 1101, VALIFAST RED 3320, VALIFAST RED 3304, VALIFAST RED 1306, VALIFAST BLE 2610, VALIFAST BLE 2606, VALIFAST BLE 1603, OIL YELLOW GG-S, OIL YELLOW 3G, OIL YELLOW 129, OIL YELLOW 107, OIL YELLOW 105, OIL SCARLET 308, OIL RED RR, OIL RED OG, OIL RED 5B, OIL PINK 312, OIL BLUE BOS, OIL BLUE 613, OIL BLUE 2N, OIL BLACL BY, OIL BLACL BS, OIL BLACL 860, OIL BLACL 5970, OIL BLACL 5906, OIL BLACL 5905 manufactured by Orient Chemical Industries; KAYASET YELLOW SF-G, KAYASET YELLOW K-CL, KAYASET YELLOW GN, KAYASET YELLOW A-C, KAYASET YELLOW 2G, KAYASET RED SF-4G, KAYASET RED K-BL, KAYASET RED A-BR, KAYASET MAGENTA 312, KAYASET BLUE K-FL manufactured by NIPPON KAYAKU Co., Ltd.; FS Yellow 1015, FS Magenta 1404, FS Cyan 1522, FS Blue 1504, C. I. Solvent Yellow 88, 83, 82, 79, 56, 29, 19, 16, 14, 04, 03, 02, 01, C. I. Solvent Red 84:1, C. I. Solvent Red 84, 218, 132, 73, 72, 51, 43, 27, 24, 18, 01, C. I. Solvent Blue 70, 67, 44, 40, 35, 11, 02, 01, C. I. Solvent Black 43, 70, 34, 29, 27, 22, 7, 3, C. I. Solvent Violet 3, C. I. Solvent Green 3 and 7, PLAST Yellow DY352, PLAST Red 8375 manufactured by ARIMOTO CHEMICAL Co., Ltd.; MS Yellow HD-180, MS Red C, MS Magenta HM-1450H, MS Blue HM-1384 manufactured by Mitsui Chemicals Inc.; ES Red 3001, ES Red 3002, ES Red 3003, TS Red 305, ES Yellow 1001, ES Yellow 1002, TS Yellow 118, ES Orange 2001, ES Blue 6001, TS Turq Blue 618 manufactured by Sumitomo Chemical Co., Ltd.; MACROLEX Yellow 6G, CERES BLUE GNNEOPAN Yellow O75, CERES BLUE GN, MACROLEX Red Violet R manufactured by Bayer, and the like. In addition, metal complex coloring matters shown in JP-A Nos. 9-277693, 10-20559 or 10-30061 may also be used preferably.

Disperse dyes can be used as the oil-soluble dye, and, although not limited to dyes below, particularly preferable specific examples thereof include C. I. Disperse yellow 5, 42, 54, 64, 79, 82, 83, 93, 99, 100, 119, 122, 124, 126, 160, 184:1, 186, 198, 199, 204, 224 and 237; C. I. Disperse Orange 13, 29, 31:1, 33, 49, 54, 55, 66, 73, 118, 119 and 163; C. I. Disperse red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C. I. Disperse Violet 33; C. I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; C. I. Disperse green 6:1 and 9; and the like.

In addition, azomethine coloring matters obtained by oxidation-coupling an amino compound such as p-phenylenediamines or p-diaminopyridines with a so-called coupler such as a cyclic methylene compound such as phenol, naphthol, pyrazolone or pyrazolotriazole or a an open-chain methylene compound, indoaniline coloring matters and the like are also preferable as the oil-soluble dye. Azomethine coloring matters having a pyrazolotriazole ring are preferable as magenta dyes in particular.

(Reactive Emulsifying Agent)

In the invention, a reactive emulsifying agent may be introduced by being added and copolymerized at the polymerization reaction. When introducing the reactive emulsifying agent, water-insoluble colorant particles excellent in water-dispersibility and excellent in stability may be obtained.

Examples of the reactive emulsifying agent for use in the invention include, as a nonion-based emulsifying agent, AQUALON RN-10, RN-20, RN-30, RN-50 (all manufactured by Dai-ichi Kogyo Seiyaku Co., Ltd.), ADEKALIA SOAP NE-10, NE-20, NE-30 (all manufactured by ADEKA) and the like, and, as an anionic emulsifying agent, AQUALON HS-10, HS-20, HS-1025, AQUALON KH-05, KH-10 (all manufactured by Dai-ichi Kogyo Seiyaku), LATEMUL S-180 (manufactured by Kao), ADEKALIA SOAP SE-10N, SE-20N (all manufactured by ADEKA) and the like.

For such water-insoluble colorant particles, a shell of an organic polymer may further be formed on the water-insoluble colorant particle as a core, in order to prevent the aggregation of water-insoluble colorant particles for furthermore long period of time, to improve the stability of fine particles as an ink suspension, and to obtain favorable color tone and gloss, and, in addition, toughness of the images printed on a medium, such as light resistance.

As methods for forming the shell, examples of the method include a method in which a polymer dissolved in an organic solvent is gradually dropped to allow the polymer to be adsorbed to the surface of the water-insoluble colorant particle in parallel with the precipitation. In the invention, a method, in which water-insoluble colorant particles to be the core containing a colorant and a resin are formed and, then, a monomer having a polymerizable unsaturated double bond is added to be subjected to an emulsion polymerization in the presence of an active agent to perform the deposition onto the core surface in parallel with the polymerization, is preferable. When the method is used for the formation, as can be seen in such a case where a dye is used as a colorant, there is certain mixture of phases at the interface of core/shell. Accordingly, the colorant content ratio in the shell is not always zero. But, a less mixture is more preferable, and the colorant content ratio (concentration) in the shell is preferably 0.8 or less relative to the colorant content ratio (concentration) in cores not subjected to the core/shell operation, more preferably 0.5 or less.

Examples of the monomer having a polymerizable unsaturated double bond for forming a polymer to cover colorant particles as the shell include compounds selected from ethylene, propylene, butadiene, vinyl chloride, vinylidene chloride, vinyl acetate, styrene, (meth)acrylic acid esters, (meth) acrylic acid, acryl amides and the like. In particular, styrene and (meth)acrylic acid esters such as ethyl (meth)acrylate, butyl (meth)acrylate and ethylhexyl (meth)acrylate are preferable. Further, in addition to these monomers, it is preferable to use a polymerizable unsaturated monomer containing a hydroxyl group in a molecule, for example, an ester such as a hydroxyalkyl (meth)acrylate including a hydroxyethyl (meth)acrylate and the like in an amount of 50% of the total starting monomers for forming the shell at the maximum and other monomers having an ethylenically unsaturated double bond in combination. Further, from the reason of increasing the stability of the shell and the like, an ethylenically unsaturated monomer having a dissociable group of a pKa value from 3 to 7 such as a monomer containing a carboxylic acid such as acrylic acid and methacrylic acid, or a monomer containing a sulfonic acid may be used in an amount of 10% or less. By using a monomer component having a hydroxyl group or the like (specifically, monomers having a hydrated layer-forming group such as acrylic acid and methacrylic acid, and the like) for forming the shell, the stability of the aqueous dispersion composition of core/shell water-insoluble colorant particles may be dramatically be enhanced.

For the water-insoluble colorant particle in the invention, in order to obtain a suitable particle diameter, the optimization of the formulation and the selection of an appropriate emulsifying method may be considered. Although the formulation varies depending on the colorant and polymer to be used, since a suspension in water is to be formed, a polymer of the shell is generally required to have a higher hydrophilicity as compared with a polymer of the core. In addition, as described above, a colorant contained in a polymer of the shell is preferably less than that contained in a polymer of the core, and the colorant is also required to have less hydrophilicity than the polymer of the shell. The hydrophilicity and the hydrophobicity can be estimated using, for example, the aforementioned solubility parameter (SP).

[Dispersion Average Particle Diameter (Volume) by a Dynamic Light Scattering Method]

The particles A in the invention have a dispersion average particle diameter of 5 to 50 nm. The dispersion average particle diameter of the particles A means a volume average particle diameter obtained by the dynamic light scattering method as described below. The volume average particle diameter is measured with a particle size analyzer MICROTRAC (Version 10.1.2-211BH) manufactured by Nikkiso Co., Ltd., using the dispersion liquid of the particles A having been diluted at a dilution factor of 1 to 1000 times with water.

In the invention, unless otherwise noted, the dispersion average particle diameter means a volume average particle diameter obtained by the dynamic light scattering method.

In the invention, the dispersion state of the particles A can be evaluated by obtaining the volume average particle diameter by the dynamic light scattering method. The principle thereof is as follows.

Particles having a particle diameter in a range from about 1 nm to 5 μm change momentarily the position and orientation due to the Brownian motion such as translation and rotation in a liquid. Accordingly, when irradiating laser light to these particles and detecting output scattered light, the fluctuation of the scattered light intensity depending on the Brownian motion is observed. By monitoring the fluctuation of the scattered light intensity over time, the velocity of the Brownian motion (diffusion coefficient) of particles can be obtained, and, consequently, the size of the particles can be found.

In the recording liquid of the invention, the volume average particle diameter calculated by the aforementioned dynamic light scattering method is calculated as a value obtained by detecting the volume average particle diameter of both the particles A and the self-dispersible polymer particles B included in the recording liquid. In this case, by using transmission electron microscope observation (hereinafter, written as "TEM observation") and the like and the dynamic light scattering method in combination, the dispersion average particle diameter of the particles A included in the recording liquid can be decided. Details will be described below.

When a measured value of the dispersion average particle diameter (volume average particle diameter) of particles included in the recording liquid using the dynamic light scattering method is close to the average particle diameter (TEM average particle diameter) of the particles A obtained by TEM observation, the fact means that the particles A in the liquid are in a monodipersed state (the particles neither join nor aggregate with each other).

That is, each of particles disperses with a distance to each other in a dispersion medium, and is in a state that allows the particles to move alone independently.

The case, where the value of the dispersion average particle diameter (volume) by the dynamic light scattering method is close to the value of the TEM average particle diameter, means specifically a case where the ratio of the "dispersion average particle diameter (volume average particle diameter)" calculated by the dynamic light scattering method relative to the "TEM average particle diameter" (the dispersion average particle diameter (volume average particle diameter) calculated by the dynamic light scattering method)/TEM average particle diameter) is from 0.5 to 2.5.

Further, from the standpoint of the dispersion state, the value of "dispersion average particle diameter (volume) calculated by the dynamic light scattering method"/"TEM average particle diameter" is more preferably from 0.5 to 2.0, and most preferably from 0.5 to 1.5 as a measure of a state in which each of particles disperses without the joining or agglomeration in a dispersion medium.

[Average Particle Diameter by Transmission Electron Microscope Observation (TEM Average Particle Diameter)]

In the invention, by observing the particle figure of the particles A included in the recording liquid with a transmission electron microscope (TEM), the average particle diameter can be calculated in a manner described below.

A dispersion liquid including the particles A is diluted, which is then mounted on a Cu 200 mesh adhered with a carbon membrane and dried. From an image photographed with a TEM (1200EX, manufactured by JEOL) at a magnification of 100,000, the diameter of 300 particles is measured and the average value is obtained.

On this occasion, since the recording liquid is dried on the Cu 200 mesh as described above, even when the particles A are in a good dispersion state in the recording liquid, occasionally particles A may apparently aggregate in the drying process, with which an accurate particle diameter may not be determined. In this case, diameters of independent 300 particles which are not stacked up each other are measured and the average value is obtained. When the particle A is not spherical, the major particle diameter (the longest diameter of a particle) is measured.

(Definition of Crystallite Diameter)

The particles A included in the recording liquid of the invention include one or more kinds of water-insoluble colorants, wherein a portion having a crystalline structure and a portion having no crystalline structure may exist together in the particle. The particle may have such a structure in which a pigment and/or another compound forms a core of a particle and, to the nucleus, a dispersing agent (polymer compound, a surfactant or the like) described later is adsorbed so as to cover the core.

The phrase "having a crystalline structure" here means that neither (i) nor (ii) described below is appropriate when the water-insoluble colorant included in respective inks is subjected to powder X-ray diffraction analysis:

(i) halo specific for an amorphous structure is observed;

(ii) a crystallite diameter determined by a measuring method described below is less than 20 Å, or presumed to be in an amorphous state.

In the invention, a crystallite diameter is measured and calculated as follows.

Firstly, X-ray diffraction analysis is performed using the Cu—Kα1 ray. Next, the half-width of a peak that shows the greatest intensity, or a peak that is separable from neighboring peaks and shows sufficiently great intensity in the range of 2θ=4 degrees to 70 degrees, then the crystallite diameter is calculated by the Sherrer's formula below:

$$D = K \times \lambda / (\beta \times \cos \theta) \quad \text{Sherrer's formula}$$

In the formula, D is a crystallite diameter (nm, the size of a crystallite), λ is an X-ray wavelength (nm) used in the measurement, β is a spread of the diffraction line based on the size of the crystal (radian), θ is the Bragg angle of the diffraction line (radian), and K is a constant number (the constant number which varies depending on β and D)]

It is generally known that, when the half-width β/2 is used for β, K is 0.9. Since the wavelength of the Cu—Kα1 ray is 0.154050 nm, the crystallite diameter D (nm) in the invention is calculated based on the formula below:

$$D = 0.9 \times 0.154050 / (\beta/2 \times \cos \theta)$$

When the peak of a spectrum obtained by the measurement is broad and the half-width of the peak cannot be determined, it is presumed that the crystallite diameter is less than 2 nm (microcrystalline state) or in an amorphous (non crystalline) state.

In the recording of the invention, in order to maintain a high light resistance and to obtain a hue having the same hue gamut as that of a solid crystal, the particle A preferably has a crystalline structure.

(Monodispersibility of the Dispersion Average Particle Diameter of the Water-Insoluble Colorant Particles)

In the invention, it is preferable that the particle diameter of the particles A dispersed in the ink is in a monodisperse state. The "monodisperse state (monodispersion)" here means that the distribution of the particle diameters is narrow.

When the particles A are in a monodisperse state, it is possible to reduce the influence by the particles having a large particle diameter, such as light scattering, and also, for example, to advantageously control the packing figure of aggregates to be formed when forming aggregates in printing and recording using the ink.

As an index for evaluating the dispersibility of the particles A, for example, the difference between $D_{90}$ and $D_{10}$ ($D_{90}-D_{10}$) can be used, wherein, $D_{90}$ and $D_{10}$ represent, respectively, in the particle diameter distribution obtained by the dynamic light scattering method, a particle diameter at which an integrated value of a particle diameter distribution function of the colorant particles which is represented by a formula $dG=F(D)dD$ is 90% by number of the total number of colorant particles, and 10% by number of the total number of colorant particles, wherein G represents the number of particles, and D represents a particle diameter.

In the invention, the difference between the $D_{90}$ and the $D_{10}$ is preferably 45 nm or less, more preferably from 1 to 30 nm, and particularly preferably from 1 to 20 nm. This method can also be applied to a particle diameter distribution curve drawn using the above-described particle diameters observed with a transmission electron microscope.

Further, as an indicator for evaluating the dispersibility of the water-insoluble colorant particle of the invention, there is a polydispersity index (PDI).

The polydispersity index (PDI) in the invention is an index that defines the distribution of particle diameters of dispersed particles, and is defined by Formula (1) below:

$$PDI = (D_{90} - D_{10})/D_{50} \quad \text{Formula (1)}$$

In Formula (I), $D_{90}$, $D_{50}$ and $D_{10}$ each represents a particle diameter at which the integrated value of the distribution function which is represented by a formula $dG=F(D)dD$ is equal to, respectively, 0.9 (90% by number) of the total number of particles, 0.5 (50% by number) and 0.1 (10% by number). G represents the particle number of the dispersion particle, and D represents the particle diameter of the dispersion particle.

In Formula (1), the narrower the particle diameter distribution, the closer to zero (0) the PDI, and, inversely, the broader the particle diameters distribution, that is, the greater the polydispersibility, the greater the PDI.

The polydispersity index (PDI) of the particles A included in the recording liquid of the invention is preferably 2 or less, more preferably from 0.2 to 1.8, and furthermore preferably from 0.2 to 1.6.

The particles A having a dispersion average particle diameter from 5 to 50 nm, and having a polydispersity index (PDI) within the above range may tend to give a further increased high transparency of the ink liquid and a high density in printed matters. Meanwhile, polydispersity indices (PDIs) outside the above range may tend to increase the scattered-light component in the ink liquid.

Meanwhile, this method can also be applied to a particle diameter distribution curve drawn using the above-described particle diameters observed with a transmission electron microscope.

As another example of an index showing the dispersibility, the ratio (Mv/Mn) of the volume average particle diameter (Mv) obtained by the dynamic scattering method relative to the number average particle diameter (Mn) can also be employed. For the ink of the invention, the value of Mv/Mn is preferably 1.5 or less, more preferably 1.3 or less for reducing the scattered-light component due to the colorant, and particularly preferably 1.2 or less.

The aforementioned monodispersity greatly contributes to reduce a scattered-light component due to the particles A in an ink including the fine particles A having a dispersion average particle diameter from 5 to 50 nm. Accordingly, in an ink including the fine particles A having a dispersion average particle diameter from 5 to 50 nm, it is preferable that the particles have a monodispersity within the aforementioned range.

In the recording liquid of the invention, it is preferable that the amount of coarse particles or coarse secondary aggregates (which mean the aggregates of primary particles) included in respective inks is small. Among the water-insoluble colorant particles included in respective inks, the number of water-insoluble colorant particles having a dispersion average particle diameter of 0.57 µm or more is $1.2 \times 10^7$/ml or less from the standpoint of scratching resistance, preferably $1.0 \times 10^7$/ml or less, and particularly preferably $0.8 \times 10^7$/ml or less further from the standpoint of ejection stability.

The number of the water-insoluble colorant particles having a dispersion average particle diameter of 0.57 µm or more can be measured using a single-particle optical sensing method (SPOS), and, specifically, be measured using ACCU-SIZER manufactured by PARTICLE SIZING SYSTEMS. In the measurement, a sample obtained by diluting 0.5 ml of an ink to 5 ml with pure water is used, and the number of particles having a dispersion average particle diameter of 0.57 µm or more included in the ink is measured at a measurement temperature of 25° C.

The recording liquid of the invention preferably includes the particles A from 0.1 to 20% by mass from the standpoint of offering printed matters having excellent color density, more preferably from 0.1 to 15% by mass. The recording liquid of the invention particularly preferably includes the particles A from 0.1 to 10% by mass from the standpoint of maintaining the long-term storage stability and the viscosity of the recording liquid.

[Self-Dispersing Polymer Particles B]

The recording liquid of the invention includes at least one kind of self-dispersible polymer particles B including a constituent unit derived from an aromatic group-containing acrylate monomer. Since the recording liquid of the invention includes the self-dispersible polymer B, the viscosity of the recording liquid may be lowered, and the scratching resistance of recorded images may be improved.

The self-dispersible polymer particles B in the invention includes a self-dispersible polymer described below, but it may also contain another component according to need.

The self-dispersible polymers in the invention contain a constituent unit derived from an aromatic group-containing acrylate monomer, and, from the standpoint of the stability and viscosity of the recording liquid, it is preferable that the content of the constituent unit derived from an aromatic group-containing acrylate monomer is from 10% by mass to 95% by mass and the content of water-soluble component showing water solubility when being brought into a dispersion state in an aqueous medium is 10% by mass or less.

In the self-dispersible polymer in the invention, the content of the water-soluble component showing water solubility when being brought into a dispersion state is preferably 10% by mass or less, more preferably 8% by mass or less, and furthermore preferably 6% by mass or less. When the water soluble component is 10% by mass or less, the lowering of stability of the dispersion state due to the swelling of the polymer particle and the fusion of polymer particles with each other may be suppressed. The increase in the viscosity of the aqueous dispersion may also be suppressed.

In the invention, the self-dispersible polymer means a water-insoluble polymer capable of becoming in a dispersion state in an aqueous medium due to a functional group (particularly an acidic group or a salt thereof) of the polymer itself, in the absence of a surfactant. Here, the dispersion state includes both an emulsified state (emulsion) in which a water-insoluble polymer is dispersed in a liquid state in an aqueous medium, and a dispersion state (suspension) in which a water-insoluble polymer is dispersed in a solid state in an aqueous medium.

As the self-dispersible polymer in the invention, a self-dispersible polymer capable of becoming in a dispersion state in which a water-insoluble polymer is dispersed in a solid state is preferable, from the standpoint of an ink-fixing properties when incorporated in a recording liquid.

Examples of the method for preparing an emulsified or dispersion state of the self-dispersible polymer, that is, an aqueous dispersion of the self-dispersible polymer include a method including the steps of dissolving or dispersing the self-dispersible polymer in a solvent (such as a water-soluble organic solvent), putting directly the obtained product in water without adding a surfactant, mixing the same with stirring in a state in which a salt-generating group (such as an acidic group) of the self-dispersible polymer is neutralized, and removing the solvent to give an aqueous dispersion having an emulsified or dispersed state.

The emulsified or dispersion state of the self-dispersible polymer in the invention means such state that a emulsified or dispersion state can visually be confirmed to exist stably at least for one week at 25° C., even after mixing and stirring (apparatus: a stirring apparatus provided with a stirring blade (s); rotation number: 200 rpm; for 30 minutes at 25° C.) a solution formed by dissolving 30 g of the water-insoluble polymer in 70 g of an organic solvent (such as methyl ethyl ketone), a neutralizing agent (sodium hydroxide for an anionic salt-generating group, acetic acid for a cationic one) capable of neutralizing 100% of the salt-generating group of the water-insoluble polymer and 200 g of water, and, then, removing the organic solvent.

The water-insoluble polymer means a polymer showing a dissolution amount of 10 g or less when it is dried at 105° C. for 2 hours and, then, dissolved in 100 g of water at 25° C. The dissolution amount is preferably 5 g or less, and furthermore preferably 1 g or less. The dissolution amount is a dissolution amount obtained when 100% of the salt-generating group of the water-insoluble polymer is neutralized with sodium hydroxide or acetic acid, depending on the kind of the group.

The water-soluble component means a compound that is included in the self-dispersible polymer and is dissolved in water when the self-dispersible polymer is brought into an emulsified or dispersion state. The water-soluble component is a water-soluble compound that is obtained as a by-product or is incorporated when manufacturing the self-dispersible polymer.

The aqueous medium includes water, and, according to need, may include a water-soluble organic solvent. In the invention, the aqueous medium is preferably constituted of water and 0.2% by mass or less of a water-soluble organic solvent relative to the water, and more preferably the aqueous medium is water.

The main-chain skeleton of the water-insoluble polymer may be a vinyl polymer.

Favorable examples of the vinyl polymer and the monomer used for the vinyl polymer include ones described in JP-A Nos. 2001-181549 or 2002-88294. Vinyl polymers, which has a dissociable group at the end of a polymer chain introduced by radical polymerization of a vinyl monomer using a chain transfer agent, polymerization initiator or iniferter having a dissociable group (or a substituent capable of being induced to a dissociable group), or by ion polymerization using a compound having a dissociable group (or a substituent capable of being induced to a dissociable group) as a initiator or a terminating agent, are also usable.

In the self-dispersible polymer in the invention, the content of the constituent unit derived from an aromatic group-containing acrylate monomer is preferably from 10% by mass to 95% by mass, from the standpoint of the viscosity of the recording liquid and the scratching resistance. When the content of the constituent unit derived from an aromatic group-containing acrylate monomer is 95% by mass or less, the stability of the self-emulsified or dispersion state may be further improved. Further, when the content of the constituent unit derived from an aromatic group-containing acrylate monomer is 10% by mass or more, the figure of particles in the aqueous medium may be more stabilized, and the increase in the content of the water-soluble component in the self-dispersible polymer can be suppressed.

In the invention, the content of the constituent unit derived from an aromatic group-containing acrylate monomer is preferably from 15% by mass or more to 90% by mass or less, and furthermore preferably from 15% by mass or more to 80% by mass or less, from the standpoint of the stability of the self-dispersion state, stabilizing the figure of particles in the aqueous medium due to the hydrophobic interaction between aromatic rings, and the reduction of the amount of the water-soluble component due to a reasonable hydrophobization of particles.

No particular limitation is imposed on the aromatic group-containing acrylate monomer, so long as it is an acrylate compound containing an aromatic group. The aromatic group may be a group derived from an aromatic hydrocarbon, or a group derived from an aromatic heterocycle. In the invention, it is preferably an aromatic group derived from an aromatic hydrocarbon, from the standpoint of the stability of particle figures in the aqueous medium.

Examples of the aromatic group-containing acrylate monomer include phenoxyethyl (meth)acrylate, benzyl (meth)acrylate, phenyl (meth)acrylate, styrene-based monomers and the like. Among them, at least one kind selected from phenoxyethyl (meth)acrylate, benzyl (meth)acrylate, and phenyl (meth)acrylate is preferable, and phenoxyethyl acrylate is furthermore preferable, from the standpoint of balancing the hydrophilicity and hydrophobicity of the polymer chain.

Here, "(meth)acrylate" means acrylate or methacrylate, "(meth)acrylamide" means acrylamide or methacrylamide, and "(meth)acrylic" means acrylic or methacrylic.

In the invention, the aromatic group-containing acrylate monomers may be used in one kind alone, or in two or more kinds in combination.

The self-dispersible polymer in the invention preferably contains a hydrophilic constituent unit. No particular limitation is imposed on the hydrophilic constituent unit, so long as it is derived from a hydrophilic group-containing monomer, wherein it may be one derived from one kind of a hydrophilic group-containing monomer, or one derived from two or more kinds of hydrophilic group-containing monomers. No particular limitation is imposed on the hydrophilic group, and it may be a dissociable group or a nonionic hydrophilic group.

In the invention, the hydrophilic group is preferably a dissociable group, and more preferably an anionic dissociable group, from the standpoint of accelerating the self-dispersion and from the standpoint of the stability of the emulsified or dispersion state to be formed. Examples of the dissociable group include carboxyl group, phosphoric acid group, sulfonic acid group and the like. Among them, a carboxyl group is preferable, from the standpoint of fixing properties when an aqueous ink composition is constituted.

The hydrophilic group-containing monomer in the invention is preferably a dissociable group-containing monomer, and preferably a dissociable group-containing monomer having a dissociable group and an ethylenically unsaturated bond, from the standpoint of self-dispersibility.

Examples of the dissociable group-containing monomer include an unsaturated carboxylic acid monomer, an unsaturated sulfonic acid monomer, an unsaturated phosphoric acid monomer and the like.

Specific examples of the unsaturated carboxylic acid monomer include acrylic acid, methacrylic acid, crotonic acid, itaconic acid, maleic acid, fumaric acid, citraconic acid, 2-methacryloxymethylsuccinic acid and the like. Specific examples of the unsaturated sulfonic acid monomer include styrene sulfonic acid, 2-acrylamide-2-methyl propane sulfonic acid, 3-sulfopropyl (meth)acrylate, bis-(3-sulfopropyl)-itaconic acid ester and the like. Specific examples of the unsaturated phosphoric acid monomer include vinylphosphonic acid, vinyl phosphate, bis(methacryloxyethyl) phosphate, diphenyl-2-acryloyloxyethyl phosphate, diphenyl-2-methacryloyloxyethyl phosphate, dibutyl-2-acryloyloxyethyl phosphate and the like.

Among the dissociable group-containing monomers, unsaturated carboxylic acid monomers are preferable, and acrylic acid and methacrylic acid are more preferable from the standpoint of dispersion stability and ejection stability.

The acid value (mg KOH/g) of the self-dispersible polymer in the invention is preferably from 20 to 150, and more preferably from 25 to 95, from the standpoint of the self-dispersibility, the content of water-soluble component and fixing properties of the aqueous ink composition formed by using the self-dispersible polymer as a component. When the acid value is 20 or more, particles may disperse in more stably, and when the acid value is 150 or less, water-soluble components may be reduced.

The self-dispersible polymer in the invention can be composed, for example, of a constituent unit derived from an aromatic group-containing monomer, and preferably a constituent unit derived from a dissociable group-containing monomer. The self-dispersible polymer may further include an additional constituent unit(s), according to need.

No particular limitation is imposed on monomers forming the aforementioned additional constituent units, so long as they are monomers capable of copolymerizing with the aforementioned aromatic group-containing acrylate monomer and the dissociable group-containing monomer. Among them, alkyl group-containing monomers are preferable, from the standpoint of the flexibility and the easiness of controlling the glass transition temperature (Tg) of the polymer skeleton.

Examples of the alkyl group-containing monomer include alkyl (meth)acrylates such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate and ethylhexyl (meth)acrylate; ethylenically unsaturated monomers having a hydroxyl group such as hydroxymethyl (meth)acrylate, 2-hydroxethyl (meth)acrylate, 2-hydroxypropyl (meth)acrylate, 4-hydroxybutyl (meth)acrylate, hydroxypentyl (meth)acrylate and hydroxyhexyl (meth)acrylate; dialkylaminoalkyl (meth)acrylates such as dimethylaminoethyl (meth)acrylate; N-hydroxyalkyl (meth)acrylamide such as N-hydroxymethyl (meth)acrylamide, N-hydroxyethyl (meth)acrylamide and N-hydroxybutyl (meth)acrylamide; and N-alkoxyalkyl (meth)acrylamides such as N-methoxymethyl (meth)acrylamide, N-ethoxymethyl (meth)acrylamide, N-(n-, iso)butoxymethyl (meth)acrylamide, N-methoxyethyl (meth)acrylamide, N-ethoxyethyl (meth)acrylamide, N-(n-, iso)butoxyethyl (meth)acrylamide, and the like.

The weight average molecular weight of the self-dispersible polymer in the invention is preferably from 3,000 to 200,000, more preferably from 5,000 to 150,000, and furthermore preferably from 10,000 to 100,000. When the weight average molecular weight is 3,000 or more, the amount of water-soluble components may be effectively suppressed, and, when the weight average molecular weight is 200,000 or less, the self-dispersion stability may be enhanced.

It is preferable that the self-dispersible polymer in the invention contains the aromatic group-containing monomer from 15 to 90% by mass in a copolymerization ratio, the dissociable group-containing monomer and the alkyl group-containing monomer, has the acid value of from 20 to 200, and has the weight average molecular weight of from 3,000 to 200,000; and it is more preferable that the self-dispersible polymer contains the aromatic group-containing monomer of 15 to 80% by mass in a copolymerization ratio, the dissociable group-containing monomer and alkyl group-containing monomer, has an acid value from 22 to 150, and has the weight average molecular weight of 5,000 to 150,000, from the standpoint of controlling hydrophilicity-hydrophobicity of the polymer.

Specific examples of the self-dispersible polymer include the following compounds B-01 to B-14, but the invention is not limited to them. Meanwhile, numerical values in the parentheses represent the mass ratio of copolymerization components.

B-01: phenoxyethyl acrylate/methyl methacrylate/acrylic acid copolymer (50/45/5)

B-02: phenoxyethyl acrylate/benzyl methacrylate/isobutyl methacrylate/methacrylic acid copolymer (30/35/29/6)

B-03: phenoxyethyl methacrylate/isobutyl methacrylate/methacrylic acid copolymer (50/44/6)

B-04: phenoxyethyl acrylate/methyl methacrylate/ethyl acrylate/acrylic acid copolymer (30/55/10/5)

B-05: benzyl methacrylate/isobutyl methacrylate/methacrylic acid copolymer (35/59/6)

B-06: styrene/phenoxyethyl acrylate/methyl methacrylate/acrylic acid copolymer (10/50/35/5)

B-07: benzyl acrylate/methyl methacrylate/acrylic acid copolymer (55/40/5)

B-08: phenoxyethyl methacrylate/benzyl acrylate/methacrylic acid copolymer (45/47/8)

B-09: styrene/phenoxyethyl acrylate/butyl methacrylate/acrylic acid copolymer (5/48/40/7)

B-10: benzyl methacrylate/isobutyl methacrylate/cyclohexyl methacrylate/methacrylic acid copolymer (35/30/30/5)

B-11: phenoxyethyl acrylate/methyl methacrylate/butyl acrylate/methacrylic acid copolymer (12/50/30/8)

B-12: benzyl acrylate/isobutyl methacrylate/acrylic acid copolymer (93/2/5)

B-13: styrene/phenoxyethyl methacrylate/butyl acrylate/acrylic acid copolymer (50/5/20/25)

B-14: styrene/butyl acrylate/acrylic acid copolymer (62/35/3)

No particular limitation is imposed on the manufacturing method of the self-dispersible polymer in the invention, and the polymer can be manufactured by copolymerizing a monomer mixture by such publicly known polymerization method as the solution polymerization method and bulk polymerization method. Among these polymerization method, the solution polymerization method is preferable from the standpoint of the ejection stability of an aqueous ink composition formed by using the self-dispersible polymer as a component.

In the manufacturing method of the self-dispersible polymer in the invention, the water-insoluble polymer can be manufactured by copolymerizing a monomer mixture, and a mixture including an organic solvent and radical polymerization initiator, according to need, under an inert gas circumstance.

It is preferable that the manufacturing method of the self-dispersible polymer in the invention further includes a process of obtaining the self-dispersible polymer as an aqueous dispersion. The process of obtaining the self-dispersible polymer as an aqueous dispersion preferably includes processes (1) and (2) below.

Process (1): a process of stirring a mixture including the water-insoluble polymer, an organic solvent, a neutralizing agent and an aqueous medium; and Process (2): a process of removing the organic solvent from the mixture.

The process (1) is preferably a treatment, in which firstly the water-insoluble polymer is dissolved in an organic solvent and then, to the solution, a neutralizing agent and an aqueous medium are gradually added and stirred to give a dispersion. By adding the neutralizing agent and the aqueous medium into a water-insoluble polymer solution in which the water-insoluble polymer is dissolved in an organic solvent, self-dispersible polymer particles having particle diameters of higher storage stability may be obtained without requiring strong shearing force.

No particular limitation is imposed on the stirring method of the mixture, and generally employed mixing and stirring apparatuses, and, according to need, dispersing machines such as an ultrasonic dispersing machine and high pressure homogenizers may be employed.

Examples of the organic solvent preferably include alcohol-based solvents, ketone-based solvents and ether-based solvents.

Examples of the alcohol-based solvent include isopropyl alcohol, n-butanol, t-butanol, ethanol and the like. Examples of the ketone-based solvent include acetone, methyl ethyl ketone, diethyl ketone, methyl isobutyl ketone and the like. Examples of the ether-based solvent include dibutyl ether, dioxane and the like. Among these solvents, the ketone-based solvent such as methyl ethyl ketone and the alcohol-based solvent such as isopropyl alcohol are preferable. Further, for the purpose of moderately changing the polarity at the phase transition from an oil-based system to a water-based system, the use of isopropyl alcohol and methyl ethyl ketone in combination is also preferable. When these solvents are used in combination, the self-dispersible polymer particles having a small particle diameter, in which aggregation, precipitation or fusion between particles may not occur, and has high dispersion stability, may be obtained.

The neutralizing agent is used for neutralizing a part or all of the dissociable groups to allow the self-dispersible polymer to form a stable emulsified or dispersion state in water. When the self-dispersible polymer in the invention has an anionic dissociable group as a dissociable group, examples of the usable neutralizing agent include basic compounds such as organic amine compounds, ammonia and hydroxide of alkali metals. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanol amine, triisopropanol amine and the like. Examples of the hydroxide of alkali metals include lithium hydroxide, sodium hydroxide, potassium hydroxide and the like. Among them, sodium hydroxide, potassium hydroxide, triethylamine and triethanolamine are preferable from the standpoint of the dispersion stability in water of the self-dispersible polymer particles in the invention.

These basic compound are used in an amount preferably from 5 to 120% by mole relative to 100% by mole of the dissociable group, more preferably from 10 to 110% by mole, and furthermore preferably from 15 to 100% by mole. When it is 15% by mole or more, the effect of stabilizing the dispersion of particles in water may be expressed, and, when it is 100% by mole or less, effect as reduction in water-soluble components may be obtained.

In the process (2) above, the organic solvent is distilled away from the dispersion obtained in the process (1) above by an ordinary method such as vacuum distillation, thereby converting the system to an aqueous system. Accordingly, an aqueous dispersion of the self-dispersible polymer particles can be obtained. The organic solvent has substantially been removed in the obtained aqueous dispersion, and the amount of the organic solvent is preferably 0.2% by mass or less, and further preferably 0.1% by mass or less.

The dispersion average particle diameter of the self-dispersible polymer particles in the invention may be, for example, within the range from 10 to 400 nm. Among them, it is preferably from 1 to 50 nm from the standpoint of improving the scratching resistance and gloss of printed portions when being used in a recording liquid, more preferably from 1 to 45 nm from the standpoint of excellent long-term storage stability of the recording liquid, and particularly preferably from 1 to 40 nm from the standpoint of improving the color density of printed portions.

When the dispersion average particle diameter of the self-dispersible polymer particles is from 1 to 50 nm, the dispersion average particle diameter of particles included in the recording liquid of the invention is preferably from 1 to 50 nm from the standpoint of improving the scratching resistance and improving the gloss and color density of printed portions, more preferably from 1 to 45 nm from the standpoint of enhancing the long-term storage stability of the recording liquid, and, further, particularly preferably from 1 to 40 nm from the standpoint of decreasing scattered-light components and enhancing the transparency of printed portions.

No particular limitation is imposed on the particle diameter distribution of the self-dispersible polymer particles, and either of one having a broad particle diameter distribution and one having a monodisperse particle diameter distribution is usable. In addition, two or more kinds of water-insoluble particles may be used in mixture.

The average particle diameter and the particle diameter distribution of self-dispersible polymer particles can be measured, for example, using the light scattering method.

In the recording liquid of the invention, the content of the self-dispersible polymer particles B relative to the total mass of the recording liquid is preferably from 1% by mass to 20% by mass, and more preferably from 5% by mass to 10% by mass. When the content of the self-dispersible polymer particles B is 1% by mass or more, the scratching resistance and the printing density of image portions may be improved. When the content of the self-dispersible polymer particles B is 20% by mass or less, the increase in the viscosity of the recording liquid may be suppressed, whereby printing performance may be improved.

In the invention, it is preferable that the compound containing a hydrophilic group included in the particles A is a compound containing a carboxyl group and the self-dispersible polymer particles B include a constituent unit containing a carboxyl group from the standpoint of improving the dispersion stability and maintaining the viscosity, and it is more preferable that the acid value of the self-dispersible polymer particles B is smaller than the acid value of the compound containing a hydrophilic group included in the particles A. This may result in the formation of images in which the particles A and the self-dispersible polymer particles B are uniformly distributed in recording liquid-applying portions, and thereby capable of improving the scratching resistance of printed portions and of improving the gloss and the color density of printed portions. Furthermore, when the dispersion average particle diameter of particles included in the recording liquid of the invention is from 1 to 50 nm, the image-fixing speed after applying the recording liquid may be improved, and this is more preferable.

In addition, from the standpoint of improving the scratching resistance of printed matters, the recording liquid of the invention has a content ratio of preferably from 1/20 to 20/1 between the particles A and the self-dispersible polymer particles B (particles A/self-dispersible polymer particles B), and more preferably from 1/10 to 10/1.

Further, the recording liquid of the invention may include, according to need, water, a water-soluble solvent, a surfactant and another additive(s), in addition to the particles A and the self-dispersible polymer particles B.

(Water-Soluble Solvent)

In the ink in the invention, a water-soluble solvent can be used for the purpose of an anti-drying agent, a wetting agent or a penetration-accelerating agent.

The anti-drying agent is used for the purpose of preventing the clogging of an ink used as an ink for ink-jet recording at ink-ejecting openings due to the drying. As the anti-drying agent and the wetting agent, water-soluble organic solvents having a lower vapor pressure than water are preferable.

Further, for the purpose of allowing an ink used as an ink for ink-jet recording to penetrate better into paper, water-soluble organic solvents are favorably used as the penetration-accelerating agent.

Examples of the water-soluble organic solvent include alkanediols (polyhydric alcohols) such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol and 4-methyl-1,2-pentanediol; sugars such as glucose, mannose, fructose, ribose, xylose, arabinose, galactose, aldonic acid, glucitol, maltose, cellobiose, lactose, sucrose, trehalose and maltotriose; sugar alcohols; hyaluronic acids; so-called solid wetting agents such as ureas; alkyl alcohols having 1 to 4 carbon atoms such as ethanol, methanol, butanol, propanol and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether and dipropylene glycol mono-iso-propyl ether; 2-pyrrolidone, N-methyl-2-pyrrolidone, 1,3-dimethyl-2-imidazolidinone, formamide, acetamide, dimethyl sulfoxide, sorbit, sorbitan, acetin, diacetin, triacetin, sulfolane, and the like. One kind or two or more kinds thereof can be employed.

For applications to the anti-drying agent and the wetting agent, polyhydric alcohols are useful and examples thereof include glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, and the like. They may be used in one kind alone, or in two or more kinds in combination.

For the application to the penetration agent, polyol compounds are preferable. Examples of aliphatic diols include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol and 2-ethyl-1,3-hexanediol, and among them, 2-ethyl-1,3-hexanediol and 2,2,4-trimethyl-1,3-pentanediol can be mentioned as preferable examples.

Water-soluble solvents used in the invention may be used alone, or in a mixture of two or more kinds thereof. The water-soluble solvent may be used in a content from 1% by mass to 60% by mass, preferably from 5% by mass to 40% by mass, and more preferably from 10% by mass to 30% by mass.

Although no particular limitation is imposed on the addition volume of water for use in the invention, the volume is preferably from 10% by mass to 99% by mass, more preferably from 30% by mass to 80% by mass, and further preferably from 50% by mass to 70% by mass.

(Surfactant)

As surface tension-adjusting agents, nonionic, cationic, anionic and betaine surfactants are mentioned. In order to performing good ejection by ink-jet, the addition amount of the surface tension-adjusting agent may be an amount capable of adjusting the surface tension of the ink in the invention to preferably from 20 to 60 mN/m, more preferably from 20 to 45 mN/m, and furthermore preferably from 25 to 40 mN/m.

As the surfactant, compounds having a structure that includes both a hydrophilic portion and a hydrophobic portion in a molecule and the like can effectively be used, and any of anionic surfactants, cationic surfactants, amphoteric surfactants and nonionic surfactants can be used. Furthermore, the aforementioned polymer material (polymer dispersing agent) can also be used as a surfactant.

Specific examples of the anionic surfactant include sodium dodecylbenzene sulfonate, sodium laurylsulfate, sodium alkyldiphenyl ether disulfonate, sodium alkylnaphthalene sulfonate, sodium dialkylsulfo succinate, sodium stearate, potassium oleate, sodium dioctylsulfo succinate, sodium polyoxyethylene alkyl ether sulfate, sodium polyoxyethylene alkylphenyl ether sulfate, sodium oleate, sodium t-octylphenoxyethoxy polyethoxyethyl sulfate, and the like. One kind or two or more kinds of them can be selected.

Specific examples of nonionic surfactants include polyoxyethylene lauryl ether, polyoxyethylene octylphenyl ether, polyoxyethylene oleylphenyl ether, polyoxyethylene nonylphenyl ether, oxyethylene/oxypropylene block copolymer, t-octylphenoxyethyl polyethoxyethanol, nonylphenoxyethyl polyethoxyethanol and the like. One kind or two or more kinds of them can be selected.

Examples of cationic surfactants include tetraalkylammonium salts, alkylamine salts, benzalkonium salts, alkylpyridium salts and imidazolium salts, and specific examples include dihydroxyethyl stearyl amine, 2-heptadecenyl-hydroxyethyl imidazoline, lauryl dimethyl benzyl ammonium chloride, cetylpyridinium chloride, stearamide methylpyridium chloride and the like.

Although no particular limitation is imposed on the amount of the surfactant added to the ink in the invention, it is preferably 0.1% by mass or more, more preferably from 0.5 to 10% by mass, and furthermore preferably from 1 to 3% by mass.

(Other Components)

The ink in the invention may include other additives. Examples of other additives include publicly known additives such as an ultraviolet-absorbing agent, a fading inhibitor, a mildew-proofing agent, a pH-controlling agent, an anticorrosive agent, an antioxidant, an emulsion stabilizer, an antiseptic agent, a defoaming agent, a viscosity-controlling agent, a dispersion stabilizer, a chelating agent, and the like.

Examples of the ultraviolet-absorbing agent include benzophenone-based ultraviolet-absorbing agents, benzotriazol-based ultraviolet-absorbing agents, salicylate-based ultraviolet-absorbing agents, cyanoacrylate-based ultraviolet-absorbing agents, nickel complex salt-based ultraviolet-absorbing agents and the like.

As the fading-inhibitor, various organic and metal complex-based fading-inhibitors can be used. Examples of the organic fading-inhibitor include hydroquinones, alkoxyphenols, dialkoxyphenols, phenols, anilines, amines, indanes, chromans, alkoxyanilines, heterocycles and the like. Examples of the metal complex include nickel complex, zinc complex, and the like.

Examples of the mildew-proofing agent include sodium dehydroacetate, sodium benzoate, sodium pyridinethione-1-oxide, p-hydroxybenzoic acid ethyl ester, 1,2-benzisothiazoline-3-one, sodium sorbate, sodium pentachlorophenol and the like. Each of them is preferably used from 0.02 to 1.00% by mass in the ink.

No particular limitation is imposed on the pH-controlling agent, so long as it can control pH to an intended value with no adverse effect, and it may be appropriately selected in accordance with purposes. Examples thereof include alcoholamines (such as diethanolamine, triethanolamine and 2-amino-2-ethyl-1,3-propanediol), alkali metal hydroxides (such as lithium hydroxide, sodium hydroxide and potassium hydroxide), ammonium hydroxides (such as ammonium hydroxide and quaternary ammonium hydroxide), phosphonium hydroxide, alkali metal carbonates, and the like.

Examples of the anticorrosive agent include acidic sulfites, sodium thiosulfate, ammon thiodiglycolate, diisopropylammonium nitrite, pentaerythritol tetranitrate, dicyclohexylammonium nitrite, and the like.

Examples of the antioxidant include phenol-based antioxidants (including hindered phenol-based antioxidants), amine-based antioxidants, sulfur-containing antioxidants, phosphorous-containing antioxidants, and the like.

Examples of the chelating agent include sodium ethylene diamine tetra acetate, sodium nitrilotriacetate, sodium hydroxyethyl ethylene diamine triacetate, sodium diethylene triamine pentaacetate, sodium uramil diacetate, and the like.

By applying the recording liquid of the invention onto a recording medium, images can be formed. No particular limitation is imposed on the application method of the recording liquid, and publicly known application methods of the recording liquid can be employed. Among them, because of the capability of forming highly vivid images, the recording liquid of the invention is favorably applied to a method for recording an image based on the ink-jet system described later.

<Ink Set>

The ink set of the invention includes at least one kind of the aforementioned recording liquid. The ink set of the invention is employed for recording methods using the recording liquid, and is particularly preferable as an ink set for use in the ink-jet recording method described later.

The ink set of the invention can include a liquid composition for improving printing properties, in addition to the at least one kind of the recording liquid.

(Liquid Composition for Improving Printing Properties)

In the invention, prior to the application of the recording liquid, a liquid composition for improving printing properties can be applied to a recording medium.

Examples of a preferable liquid composition for improving printing properties include a liquid composition capable of generating aggregates by changing the pH of the recording liquid. The pH of the liquid composition is preferably from 1 to 6, more preferably from 2 to 5, and furthermore preferably from 3 to 5.

Examples of aggregating components for aggregating pigments include polyvalent metal salts, organic acids, polyallylamines and derivatives thereof.

Examples of the polyvalent metal salt include a salt of alkali earth metals in Second Group of Periodic Table (such as magnesium and calcium), a transition metal in Third Group of Periodic Table (such as lanthanum), a cation from Thirteen Group of Periodic Table (such as aluminum) and a lanthanide (such as neodymium). As the salt of these metals, a carboxylate salt (such as formate salt, acetate salt and benzoate salt), a nitrate salt, a chloride salt, and a thiocyanate salt are favorable. Among them, preferable are a salt of calcium or magnesium with a carboxylic acid (such as formic acid, acetic acid and benzoic acid), a salt of calcium or magnesium with nitric acid, calcium chloride, magnesium chloride, and a salt of calcium or magnesium with thiocyanic acid.

The aforementioned organic acid can be favorably selected, for example, from polyacrylic acid, acetic acid, glycol acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumarinic acid, thiophenecarboxylic acid, nicotine acid, derivatives of these compounds, salts thereof, and the like.

The aforementioned aggregating components can be used in one kind alone, or in two or more kinds in combination. The content of the aggregating component for aggregating pigments in the aqueous liquid composition is preferably from 1 to 10% by mass, more preferably from 1.5 to 7% by mass, and furthermore preferably from 2 to 6% by mass.

(Physical Properties of the Recording Liquid and the Liquid Composition)

The recording liquid and the liquid composition have a surface tension of preferably from 20 mN/m to 60 mN/m, more preferably from 20 mN to 45 mN/m, and furthermore preferably from 25 mN/m to 40 mN/m.

The recording liquid and the liquid composition have a viscosity of preferably from 1.2 mPa·s to 15.0 mPa·s, more preferably from 2 mPa·s to less than 13 mPa·s, and furthermore preferably from 2.5 mPa·s to less than 10 mPa·s, at 20° C.

<Method for Recording an Image, Recorded Matter>

The method for recording an image of the invention is a method for recording an image by an ink-jet method using the recording liquid or the ink set of the invention. Examples of a preferable ink-jet recording method of the invention include a method for forming images on publicly known recording media such as regular paper, resin-coated paper, exclusive papers for inkjet described, for example, those described in JP-A Nos. 8-169172, 8-27693, 2-276670, 7-276789, 9-323475, 62-238783, 10-153989, 10-217473, 10-235995, 10-337947, 10-217597 or 10-337947, film, paper for common use in an ink-jet system and electrophotography, fabric, glass, metal and ceramic, by giving energy to the ink in the ink set. Meanwhile, description in JP-A No. 2003-306623, paragraphs 0093-0105 can be applied as a preferable ink-jet recording method for the invention.

The recorded matter of the invention is recorded using the ink set of the invention. Specifically, the recorded matter is a preferably a recording matter that is recorded by the aforementioned ink-jet recording method on a recording medium. As the recording medium, any of the aforementioned recording medium can be used.

The recorded matter thus obtained can be a recorded matter having images excellent in weather resistance and scratching resistance.

One preferable example for the invention of the method for forming an image is a method including:

a first process: a process of applying a liquid composition for improving printing properties to a recording medium;

a second process: a process of applying the ink(s) of the ink set to the recording medium on which the liquid composition has been applied; and other processes (optionally added): no particular limitation is imposed on other processes and suitable selection is possible in accordance with purposes. For example, a drying and removing process, a heating and fixing process, and the like may be added. No particular limitation is imposed on the drying and removing process, as long as this is a process of drying and removing the ink solvent in the ink composition applied to the recording medium, and the process can be suitably selected in accordance with purposes. No particular limitation is imposed on the heating and fixing process, as long as this is a process of melting and fixing latex particles included in the ink used in the ink-jet recording method, and the process can be suitably selected in accordance with purposes.

Another preferable example for the invention of the method for forming an image is a method including:

a first process: a process of applying a liquid composition for improving printing properties to an intermediate transfer body;

a second process: a process of applying the ink(s) of the ink set to the intermediate transfer body on which with the liquid composition has been applied; and a third process: a process of transferring the ink image formed on the intermediate transfer body to a recording medium; and other processes (optionally added): no particular limitation is imposed on other processes and suitable selection is possible in accordance with purposes. For example, a drying and removing process, a heating and fixing process, and the like may be added.

<Image-Recording Apparatus>

In the image-recording apparatus of the invention, the recording liquid or the ink set of the invention is used. This makes it possible to record images excellent in weather resistance and scratching resistance.

The image-recording apparatus of the invention may include a conveying unit that conveys a recording medium, and an ejection unit that ejects the recording liquid onto a recording medium by the ink-jet method. As the conveying unit and the ejection unit, publicly known unites can be employed with no particular limitation.

EXAMPLES

Hereinafter, the present invention will be specifically described based on Examples, but the invention is not limited to these Examples. Unless otherwise noted, "part" and "%" are based on mass.

[Synthesis Example of Polymer (Polymer Dispersing Agent)]

Polymer Synthesis Example 1

The inside of a 2000 ml separable flask provided with a stirring device, reflux tube, thermometer and dropping funnel was subjected to nitrogen-substituting. Then, 200.0 parts of diethylene glycol monomethyl ether were put in the separable flask, and the temperature thereof was raised to 80° C. while stirring. Then, 200.0 parts of diethylene glycol monomethyl ether, 483.0 parts of benzyl acrylate, 100.8 parts of acrylic acid and 4.8 parts of t-butylperoxy(2-ethylhexanoate) were put in the dropping funnel, and were dropped in the separable flask at 80° C. over 4 hours to react. After the completion of the dropping, it was held at 80° C. for 1 hour, and thereto, 0.8 parts of t-butylperoxy(2-ethylhexanoate) were added and the mixture was allowed to react at 80° C. for additional 1 hour. Subsequently, the diethylene glycol monomethyl ether was removed by reduced-pressure distillation. Then, 600.0 parts of methyl ethyl ketone were added, and a polymer composition solution having a resin solid content of 50% was obtained. A part of the polymer composition solution thus obtained was collected and dried with an ignition dryer at 105° C. for 1 hour. The obtained solid matter of the polymer composition had an acid value of 130 mg KOH/g, and a weight-average molecular weight of 29000.

Polymer Synthesis Example 2

A solution of a polymer composition was obtained in substantially the same manner as that in Polymer synthesis example 1, except for using 116.3 parts of acrylic acid in place of 100.8 parts of acrylic acid.

The solid matter of the polymer composition was obtained as in Polymer synthesis example 1 and the thus obtained solid matter of the polymer composition had an acid value of 150 mg KOH/g, and a weight average molecular weight of 34000.

Polymer Synthesis Example 3

A solution of a polymer composition was obtained in substantially the same manner as that in Polymer synthesis example 1, except for using 77.5 parts of acrylic acid in place of 100.8 parts of acrylic acid.

The solid matter of the polymer composition was obtained as in Polymer synthesis example 1 and the thus obtained solid matter of the polymer composition had an acid value of 100 mg KOH/g, and a weight average molecular weight of 25000.

[Production of Colorant Dispersion]

(Production of Magenta Dispersion Liquid J)

As a dispersing agent, 10 parts of dried product of the solution of polymer composition produced in Polymer synthesis example 1 were dissolved in 80 parts of dimethylsulfoxide, and thereto 10 parts of C. I. PR122 quinacridone pigment were added and suspended in a flask under air atmosphere at 25° C. Next, a 25% tetramethylammonium hydroxide methanol solution (manufactured by Wako Pure Chemical Industries, Ltd.) was dropped in small amounts to dissolve the quinacridone pigment, thereby obtaining a deep bluish-purple solution. The pigment solution was stirred for 3 hours, and then quickly put into cooled and thermally insulated ion-exchanged water (ion-exchanged water 400 parts relative to the pigment 10 parts: 0° C.) stirred with impeller system stirring blades (800 rpm), using two SYSTEM DISPENSERs (manufactured by MUSASHI ENGINEERING, needle inner diameter: 0.58 mm, discharge pressure: 4.0 kgf/cm$^2$), and a transparent reddish pigment dispersion composition was obtained.

The dispersion average particle diameter (volume average particle diameter) of the pigment dispersion composition was obtained by the dynamic light scattering method using MICROTRAC (Version 10.1.2-211BH) manufactured by Nikkiso Co., Ltd., and the dispersion average particle diameter (volume average particle diameter) thus obtained was 30.0 nm (TEM average particle diameter: 23.0 nm), and the ratio, volume average particle diameter Mv/number average particle diameter Mn, which is an index of monodispersibility, was 1.19.

Hereinafter, the dispersion average particle diameter of pigment dispersion composition was measured in the same manner as that described above.

Next, to the pigment dispersion composition, hydrochloric acid was dropped to adjust pH to 3.5 to aggregate pigment particles from the pigment dispersion composition. After that, the aggregates were vacuum-filtrated using a membrane filter having an average pore diameter of 0.2 μm, and washed with ion-exchanged water twice, thereby obtaining a paste of the dispersion composition of pigment particles, from which salts and solvent had been removed.

Next, to the paste, 100 parts of acetone was added, which was then subjected to stirring and ultrasonic treatments. After that, the product was vacuum-filtrated using a membrane filter having an average pore diameter of 0.2 μm, thereby obtaining a paste of the dispersion composition containing the pigment particle. The paste was washed with ion-exchanged water, which was then vacuum-filtrated again using a membrane filter having an average pore diameter of 0.2 μm, thereby obtaining a paste of the dispersion composition containing the pigment particle.

Next, to the paste, a small volume of ion-exchanged water was added, and further a 15% tetramethylammonium hydroxide aqueous solution (manufactured by Wako Pure Chemical Industries, Ltd.) was added, and then ion-exchanged water was added, and the mixture was stirred for 1 hour. After that, ion-exchanged water was added so as to give a pigment content of 10%. Thereto, a 15% tetramethylammonium hydroxide aqueous solution was further added to adjust a pH to 9.5, and then a magenta dispersion liquid J was obtained.

The magenta dispersion liquid J was diluted 50 times with ultrapure water and then the dispersion average particle diameter (volume average particle diameter) was obtained by the dynamic light scattering method. The dispersion average particle diameter (volume average particle diameter) thus obtained was 30.5 nm (TEM average particle diameter: 25.3 nm) and the ratio, volume average particle diameter Mv/number average particle diameter Mn, which is an index of monodispersibility, was 1.17.

The magenta dispersion liquid J showed no change of the particle diameter, no precipitate or no discoloration, after two-week storage.

(Production of Magenta Dispersion Liquid K)

As a dispersing agent, 10 parts of dried product of the solution of polymer composition produced in Polymer synthesis example 2 were dissolved in 80 parts of dimethylsulfoxide, and thereto, 10 parts of C. I. PV19 quinacridone pigment were added and suspended in a flask under air atmosphere at 25° C. Next, a 25% tetramethylammonium hydroxide methanol solution (manufactured by Wako Pure Chemical Industries, Ltd.) was dropped in small amounts to dissolve the quinacridone pigment, and a deep bluish-purple solution was obtained.

The pigment solution was stirred for 3 hours, and then quickly put into cooled and thermally insulated ion-exchanged water (ion-exchanged water 400 parts relative to the pigment 10 parts: 0° C.) stirred with impeller system stirring blades (800 rpm), using two SYSTEM DISPENSERs (manufactured by MUSASHI ENGINEERING, needle inner diameter: 0.58 mm, discharge pressure: 4.0 kgf/cm$^2$), and a transparent reddish pigment dispersion composition was obtained.

The dispersion average particle diameter (volume average particle diameter) of the pigment dispersion composition was obtained by the dynamic light scattering method, and the dispersion average particle diameter (volume average particle diameter) thus obtained was 21.5 nm (TEM average particle diameter: 17.7 nm), and the ratio, volume average particle diameter Mv/number average particle diameter Mn, which is an index of monodispersibility, was 1.18.

Next, to the pigment dispersion composition, hydrochloric acid was dropped to adjust a pH to 3.5 to aggregate pigment particles from the pigment dispersion composition. After that, the aggregates were vacuum-filtrated using a membrane filter having an average pore diameter of 0.2 μm, and washed with ion-exchanged water twice, thereby obtaining a paste of the dispersion composition of pigment particles, from which salts and solvent had been removed.

To the paste, 100 parts of acetone was added, which was then subjected to stirring and ultrasonic treatments. After that, the product was vacuum-filtrated using a membrane filter having an average pore diameter of 0.2 μm, thereby obtaining a paste of the dispersion composition containing the pigment particle. The paste was washed with ion-exchanged water, which was then vacuum-filtrated again using a membrane filter having an average pore diameter of 0.2 μm, thereby obtaining a paste of the dispersion composition containing the pigment particle.

Next, to the paste, a small volume of ion-exchanged water was added, and further a 15% tetramethylammonium hydroxide aqueous solution (manufactured by Wako Pure Chemical Industries, Ltd.) was added, and then ion-exchanged water was added, and the mixture was stirred for 1 hour. After that, ion-exchanged water was added so as to give a pigment content of 10%. Thereto, a 15% tetramethylammonium hydroxide aqueous solution was further added to adjust a pH to 9.5, and then a magenta dispersion liquid K was obtained.

The magenta dispersion liquid K was diluted 50 times with ultrapure water, and then the dispersion average particle diameter (volume average particle diameter) was obtained by the dynamic light scattering method. The dispersion average particle diameter (volume average particle diameter) thus obtained was 22.3 nm (TEM average particle diameter: 18.3 nm), and the ratio, volume average particle diameter Mv/number average particle diameter Mn, which is an index of monodispersibility, was 1.17.

The magenta dispersion liquid K showed no change of the particle diameter, no precipitate or no discoloration, after two-week storage.

(Production of Magenta Dispersion Liquid L)

In the same manner as in the production of magenta dispersion liquid J, as a dispersing agent, 10 parts of dried product of the solution of polymer composition produced in Polymer synthesis example 1 were dissolved in 80 parts of dimethylsulfoxide, and thereto, 10 parts of C. I. PR122 quinacridone pigment were added and suspended in a flask under air atmosphere at 25° C. Next, a 25% tetramethylammonium hydroxide methanol solution (manufactured by Wako Pure Chemical Industries, Ltd.) was dropped in small amounts to dissolve the quinacridone pigment, and a deep bluish-purple solution was obtained. The pigment solution was stirred for 3 hours, and then quickly put into cooled and thermally insulated ion-exchanged water (ion-exchanged water 400 parts relative to the pigment 10 parts: 0° C.) stirred with impeller system stirring blades (800 rpm), using two SYSTEM DISPENSERs (manufactured by MUSASHI ENGINEERING, needle inner diameter: 0.58 mm, discharge pressure: 4.0 kgf/cm$^2$), and a transparent reddish pigment dispersion composition was obtained.

The dispersion average particle diameter (volume average particle diameter) of the pigment dispersion composition was obtained by the dynamic light scattering method, and the dispersion average particle diameter (volume average particle diameter) thus obtained was 31.8 nm (TEM average particle diameter: 24.1 nm), and the ratio, volume average particle diameter Mv/number average particle diameter Mn, which is an index of monodispersibility, was 1.20.

Next, to the pigment dispersion composition, hydrochloric acid was dropped to adjust a pH to 3.5 to aggregate pigment particles from the pigment dispersion composition. After that, the aggregates were vacuum-filtrated using a membrane filter having an average pore diameter of 0.2 μm, and washed with ion-exchanged water twice, thereby obtaining a paste of the dispersion composition of pigment particles, from which salts and solvent had been removed.

Next, to the paste, a small volume of ion-exchanged water was added, and further a 15% tetramethylammonium hydroxide aqueous solution (manufactured by Wako Pure Chemical Industries, Ltd.) was added, and then ion-exchanged water was added, and the mixture was stirred for 1 hour. After that, ion-exchanged water was added so as to give a pigment content of 10%. Thereto, a 15% tetramethylammonium hydroxide aqueous solution was further added to adjust a pH to 9.5, and then a magenta dispersion liquid L was obtained.

The magenta dispersion liquid L was diluted 50 times with ultrapure water, and the dispersion average particle diameter (volume average particle diameter) was obtained by the dynamic light scattering method. The dispersion average particle diameter (volume average particle diameter) thus obtained was 31.4 nm (TEM average particle diameter: 25.5 nm), and the ratio, volume average particle diameter Mv/number average particle diameter Mn, which is an index of monodispersibility, of 1.16.

The magenta dispersion liquid L showed no change of the particle diameter, no precipitate or no discoloration, after two-week storage.

(Production of Magenta Dispersion Liquid M)

A magenta dispersion liquid M was obtained in substantially the same manner as that in the production of the magenta dispersion liquid J, except for replacing 10 parts of C. I. PR122 quinacridone pigment by 5.2 parts of C. I. PR122 quinacridone pigment and 4.8 parts of C. I. PV19 quinacridone pigment.

The magenta dispersion liquid M was diluted 50 times with ultrapure water, and the dispersion average particle diameter (volume average particle diameter) was obtained by the dynamic light scattering method. The dispersion average particle diameter (volume average particle diameter) thus obtained was 35.3 nm (TEM average particle diameter: 28.1 nm), and the ratio, volume average particle diameter Mv/number average particle diameter Mn, which is an index of monodispersibility, was 1.20.

The magenta dispersion liquid M showed no change of the particle diameter, no precipitate or no discoloration, after two-week storage.

(Production of Magenta Dispersion Liquid N)

A magenta dispersion liquid N was obtained in substantially the same manner as that in the production of the magenta dispersion liquid J, except for replacing 10 parts of dried product of the solution of polymer composition by 4 parts thereof.

The magenta dispersion liquid N was diluted 50 times with ultrapure water, and the dispersion average particle diameter (volume average particle diameter) was obtained by the dynamic light scattering method. The dispersion average particle diameter (volume average particle diameter) thus obtained was 48.1 nm (TEM average particle diameter: 39.8 nm), and the ratio, volume average particle diameter Mv/number average particle diameter Mn, which is an index of monodispersibility, was 1.20.

The magenta dispersion liquid N showed no change of the particle diameter, no precipitate or no discoloration, after two-week storage.

(Production of Magenta Dispersion Liquid O)

To 120.0 parts of the solution of the polymer composition produced in Polymer synthesis example 3, 3.0 parts of a 30% sodium hydroxide aqueous solution was added, and the mixture was stirred for five minutes with a high-speed disperser. To the product, 480.0 parts of magenta pigment C. I. PR122 were further added, and the mixture was subjected to a dispersion treatment using a PICOMILL (dispersion medium: zirconia, temperature: 20° C., ratio of dispersion medium/dispersion liquid mass: 8/2) manufactured by ASADA IRON WORKS Co., Ltd. at a peripheral velocity of 8 m/s for 12.5 hours to give a pigment dispersion slurry. Then, the pigment dispersion slurry was subjected to dispersion of continuous 10 times at a pressure of 200 MPa with an ultrahigh pressure homogenizer (microfluidizer, manufactured by Mizuho Industries) to give a pigment dispersion liquid.

Further, the pigment dispersion liquid was subjected to a centrifugal operation at 18,000 rpm for 30 minutes with a centrifugal separator, and a supernatant liquid obtained by the centrifugal operation was concentrated and adjusted so as to give a pigment concentration of 10% by mass using an evaporator, thereby obtaining a magenta dispersion liquid O.

The magenta dispersion liquid O was diluted 50 times with ultrapure water, and the dispersion average particle diameter (volume average particle diameter) was obtained by the dynamic light scattering method. The dispersion average particle diameter (volume average particle diameter) thus obtained was 43.2 nm (TEM average particle diameter: 33.3 nm), and the ratio, volume average particle diameter Mv/number average particle diameter Mn, which is an index of monodispersibility, was 1.69.

(Production of Magenta Dispersion Liquid P)

A magenta dispersion liquid P was obtained in substantially the same manner as that in the production of the magenta dispersion liquid O, except for omitting the centrifugal operation.

The magenta dispersion liquid P was diluted 500 times with ultrapure water, and the dispersion average particle diameter (volume average particle diameter) was obtained by the dynamic light scattering method. The dispersion average particle diameter (volume average particle diameter) thus obtained was 68.4 nm (TEM average particle diameter: 40.5 nm), and the ratio, volume average particle diameter Mv/number average particle diameter Mn, which is an index of monodispersibility, was 1.70.

(Production of Magenta Dispersion Liquid Q)

To 100 parts of dimethylsulphoxide, 6 parts of C. I. PR122 and 10 parts of polyvinylpyrrolidone K25 (trade name; manufactured by Tokyo Chemical Industry Co., Ltd.) were added at a room temperature, and the mixture was stirred for 2 hours. Thereto, a 15% sodium methoxide methanol solution was dropped in small amounts to dissolve the pigment, thereby obtaining a pigment-dissolved solution.

After subjecting the pigment-dissolved solution to an ultrasonic treatment, the product was quickly put into 500 parts of cooled and thermally insulated ion-exchanged water stirred with impeller system stirring blades (800 rpm), using a SYSTEM DISPENSER (manufactured by MUSASHI ENGINEERING, needle inner diameter: 0.58 mm, discharge pressure: 4.0 kgf/cm$^2$) to give a transparent reddish pigment dispersion liquid.

The dispersion average particle diameter (volume average particle diameter) of the pigment dispersion liquid was measured by the dynamic light scattering method, the dispersion average particle diameter (volume average particle diameter) thus obtained was 33.3 nm (TEM average particle diameter: 25.0 nm), and the ratio, volume average particle diameter Mv/number average particle diameter Mn, which is an index of monodispersibility, was 1.20.

Next, to the pigment dispersion composition, hydrochloric acid was dropped to adjust a pH to 3.5 to aggregate pigment particles from the pigment dispersion composition. After that, the aggregates were vacuum-filtrated using a membrane filter having an average pore diameter of 0.2 μm, and washed with ion-exchanged water twice, thereby obtaining a paste of the dispersion composition of pigment particles, from which salts and solvent had been removed.

To the paste, 100 parts of ethyl lactate was added, which was then subjected to stirring and ultrasonic treatments. After that, the product was vacuum-filtrated using a membrane filter having an average pore diameter of 0.2 μm, thereby obtaining a paste of a dispersion composition containing the pigment particle. The paste was washed with ion-exchanged water, which was then vacuum-filtrated again using a membrane filter having an average pore diameter of 0.2 μm, thereby obtaining a paste of a dispersion composition containing the pigment particle.

Then, to the paste, 1.2 parts of sodium oleate and a small volume of ion-exchanged water were added, which was then kneaded. After that, ion-exchanged water was added so as to give a pigment content of 10%, which was then subjected to an ultrasonic treatment to give a magenta pigment dispersion liquid Q.

The magenta pigment dispersion liquid Q was diluted 50 times with ultrapure water, and the dispersion average particle diameter (volume average particle diameter) was measured by the dynamic light scattering method. The dispersion average particle diameter (volume average particle diameter) thus obtained was 35.5 nm (TEM average particle diameter: 27.4 nm), and the ratio, volume average particle diameter Mv/number average particle diameter Mn, which is an index of monodispersibility, was 1.30.

The magenta dispersion liquid Q showed no change of the particle diameter, no precipitate or no discoloration, after two-week storage.

(Production of Self-Dispersible Polymer Particle)

Synthesis Example 1

In a two-litter three-neck flask provided with a stirring device, a thermometer, a reflux cooling tube and a nitrogen gas-introducing tube, 360.0 g of methyl ethyl ketone were put, and the temperature was raised up to 75° C. While maintaining the inside temperature of the reaction vessel to 75° C., a mixed solution composed of 180.0 g of phenoxyethyl acrylate, 162.0 g of methyl methacrylate, 18.0 g of acrylic acid, 72 g of methyl ethyl ketone, and 1.44 g of "V-601" (manufactured by Wako Pure Chemical Industries, Ltd.) was dropped at a constant velocity so that the dropping would complete after 2 hours. After the completion of the dropping, a solution composed of 0.72 g of "V-601" and 36.0 g of methyl ethyl ketone was added, which was stirred at 75° C. for 2 hours, and then, additionally, a solution composed of 0.72 g of "V-601" and 36.0 g of isopropanol was added, which was stirred at 75° C. for 2 hours. Then, the temperature was raised to 85° C., and the stirring was continued for additional 2 hours. The obtained copolymer had a weight average molecular weight (Mw) of 64,000 (calculated from gel permeation chromatography (GPC) in terms of polystyrene; the column used were TSKgel Super HZM-H, TSKgel Super HZ4000, TSKgel Super HZ200 (manufactured by Tosoh)), and an acid value of 39 (mg KOH/g).

Next, 668.3 g of the polymerization solution was weighed. Thereto, 388.3 g of isopropanol and 145.7 ml of a 1 N NaOH aqueous solution were added, and the inside temperature of the reaction vessel was raised to 80° C. Next, 720.1 g of distilled water were dropped at a velocity of 20 ml/min to from an aqueous dispersion. After that, the inside temperature of the reaction vessel was maintained at 80° C. for 2 hours, at 85° C. for 2 hours, and at 90° C. for 2 hours under atmospheric pressure, and then the inside pressure of the reaction vessel was reduced to allow the isopropanol, methyl ethyl ketone and distilled water in an amount of 913.7 g in total to be distilled away, to give an aqueous dispersion of a self-dispersible polymer (B-01) having a solid content concentration of 28.0%. Meanwhile, numerals of each constituent unit of a compound example (B-01) below represent the mass ratio. The same is true on respective Formulae below.

The dispersion average particle diameter of the aqueous dispersion of the self-dispersible polymer (B-01) was measured using a MICROTRAC (Version 10.1.2-211BH) manufactured by Nikkiso Co., Ltd., the dispersion average particle diameter thus obtained was 30.2 nm.

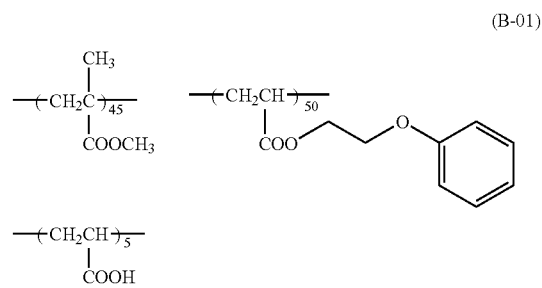

(B-01)

Synthesis Example 2

Exemplary self-dispersible polymers (B-02)-(B-05) were obtained in substantially the same manner as that in the synthesis of (B-01) in Synthesis example 1, except for replacing the mixing ratio of phenoxyethyl acrylate 180.0 g, methyl methacrylate 162.0 g and acrylic acid 18.0 g by those that gave the mass ratio of exemplary compounds below. Table 1 shows physical properties of obtained (B-02)-(B-05). Meanwhile, the neutralization degree of the self-emulsifying polymer was controlled so as to give 0.75 moles relative to 1 mole of the dissociable group by adjusting the amount of a 1 mol/L NaOH aqueous solution.

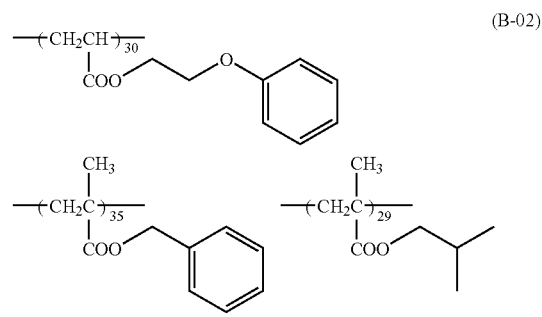

(B-02)

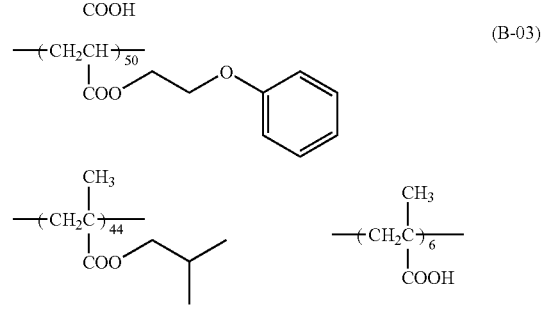

(B-03)

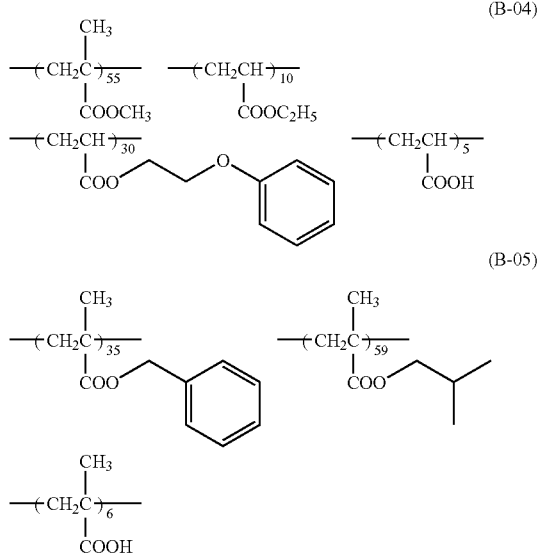

Meanwhile, the polymer synthesized in Polymer synthesis example 3 was self-dispersed in the same way to produce a self-dispersible polymer B-06 having an acid value of 100.

Comparative Synthesis Example 1

In a one-litter three-neck flask provided with a stirring device and a reflux cooling tube, 8.1 g of PIONIN A-43s (manufactured by TAKEMOTO OIL & FAT Co., Ltd.) and 236.0 g of distilled water were put, which was then heated to 70° C. and stirred under a nitrogen flow. 6.2 g of styrene, 3.5 g of n-butyl acrylate, 0.3 g of acrylic acid, 1.0 g of ammonium persulfate and 40 g of distilled water were added, and the mixture was stirred for 30 minutes. Then, a monomer solution composed of 117.8 g of styrene, 66.5 g of n-butyl acrylate and 5.7 g of acrylic acid was dropped at a constant velocity so that the dropping would complete after 2 hours. After the completion of the dropping, an aqueous solution composed of 0.5 g of ammonium persulfate and 20 g of distilled water were added, and the mixture was stirred at 70° C. for 4 hours, and then the temperature was raised to 85° C., the mixture was stirred for additional 2 hours. The reaction liquid was cooled and filtrated, thereby obtaining exemplary compound (BH-1) below. Table 1 shows physical properties of the thus obtained (BH-1).

TABLE 1

$$-(CH_2CH)_{62}- \phantom{xx} -(CH_2CH)_{35}- \phantom{xx} -(CH_2CH)_{3}- \\ \phantom{xxxxxxxxxxxx} | \phantom{xxxxxxxxxxxxx} | \\ \phantom{xxxxxxxxxxxx} COOC_4H_9 \phantom{xxx} COOH$$ (BH-1)

| | Weight average molecular weight | Acid value (mgKOH/g) | Particle diameter (nm) |
|---|---|---|---|
| B-01 | 64,000 | 39 | 30.2 |
| B-02 | 58,000 | 39 | 32.4 |
| B-03 | 65,000 | 39 | 40.3 |
| B-04 | 52,000 | 39 | 35.6 |
| B-05 | 44,000 | 39 | 45.1 |

TABLE 1-continued $$-(CH_2CH)_{62}- \phantom{xx} -(CH_2CH)_{35}- \phantom{xx} -(CH_2CH)_{3}- \\ \phantom{xxxxxxxxxxxx} | \phantom{xxxxxxxxxxxxx} | \\ \phantom{xxxxxxxxxxxx} COOC_4H_9 \phantom{xxx} COOH$$ (BH-1)

| | Weight average molecular weight | Acid value (mgKOH/g) | Particle diameter (nm) |
|---|---|---|---|
| B-06 | 25,000 | 100 | 45.4 |
| BH-1 | 23,200 | 23 | 70.7 |

Table 2 shows commercially available dispersions of self-dispersible polymer particles used for producing the ink. Meanwhile, the particle diameter means the dispersion average particle diameter, which was measured using a MICROTRAC (Version 10.1-211BH) manufactured by Nikkiso Co., Ltd.

TABLE 2

| Self-dispersing polymer | Trade name | Type | Particle diameter (nm) |
|---|---|---|---|
| BH-2 | SF 126 (Dai-ichi Kogyo Seiyaku Co., Ltd.) | Urethane-based | 12.3 |
| BH-3 | ROY-6312 (Showa Highpolymer Co., Ltd.) | Urethane-based | 35.2 |
| BH-4 | SF460 (Dai-ichi Kogyo Seiyaku Co., Ltd.) | Polycarbonate-based | 30.2 |
| BH-5 | SF460S (Dai-ichi Kogyo Seiyaku Co., Ltd.) | Polycarbonate-based | 30.7 |

The magenta dispersion liquid (pigment dispersion liquid) produced as above and self-dispersible polymer particles in Tables 1 and 2 were used for preparing liquids having compositions below (total 100 parts). After preparing the liquids, each of them was collected in a disposable syringe made of plastic, filtrated by a PVDF 5μ filter (MILLEX-SV, diameter: 25 mm, manufactured by Millipore), thereby obtaining a recording liquid (ink).

(Ink Composition of Ink M-1)
magenta pigment dispersion liquid J: 40 parts
self-dispersible polymer particles B-1: 8 parts (in terms of solid content)
SANNIX GP 250 (manufactured by Sanyo Chemical Industries, Ltd.): 10 parts
diethylene glycol monoethyl ether: 5 parts
(manufactured by Wako Pure Chemical Industries, Ltd.)
OLFINE E1010 (manufactured by Nissin Chemical Industry Co., Ltd.): 1 part
ion-exchanged water: remainder
(Ink Composition of Ink M-2)
magenta pigment dispersion liquid K: 40 parts
self-dispersible polymer particles B-1: 8 parts (in terms of solid content)
diethylene glycol: 10 parts
(manufactured by Wako Pure Chemical Industries, Ltd.)
glycerin (manufactured by Wako Pure Chemical Industries, Ltd.): 20 parts
OLFINE E1010 (manufactured by Nissin Chemical Industry Co., Ltd.): 1 part
ion-exchanged water: remainder (Ink Composition of Ink M-3)
magenta pigment dispersion liquid L: 40 parts
self-dispersible polymer particles B-1: 8 parts (in terms of solid content)
glycerin (manufactured by Wako Pure Chemical Industries, Ltd.): 20 parts
diethylene glycol: 10 parts
(manufactured by Wako Pure Chemical Industries, Ltd.)
OLFINE E1010 (manufactured by Nissin Chemical Industry Co., Ltd.): 1 part
ion-exchanged water: remainder
(Ink Composition of Ink M-4):
magenta pigment dispersion liquid N: 40 parts
self-dispersible polymer particles B-1: 8 parts (in terms of solid content)
glycerin (manufactured by Wako Pure Chemical Industries, Ltd.): 20 parts
diethylene glycol: 10 parts
(manufactured by Wako Pure Chemical Industries, Ltd.)
OLFINE E1010 (manufactured by Nissin Chemical Industry Co., Ltd.): 1 part
ion-exchanged water: remainder
(Ink Composition of Ink M-5)
magenta pigment dispersion liquid J: 40 parts
self-dispersible polymer particles B-2: 8 parts (in terms of solid content)
glycerin (manufactured by Wako Pure Chemical Industries, Ltd.): 20 parts
diethylene glycol: 10 parts
(manufactured by Wako Pure Chemical Industries, Ltd.)
OLFINE E1010 (manufactured by Nissin Chemical Industry Co., Ltd.): 1 part
ion-exchanged water: remainder
(Ink Composition of Ink M-6)
magenta pigment dispersion liquid J: 40 parts
self-dispersible polymer particles B-3: 8 parts (in terms of solid content)
glycerin (manufactured by Wako Pure Chemical Industries, Ltd.): 20 parts
diethylene glycol: 10 parts
(manufactured by Wako Pure Chemical Industries, Ltd.)
OLFINE E1010 (manufactured by Nissin Chemical Industry Co., Ltd.): 1 part
ion-exchanged water: remainder
(Ink Composition of Ink M-7)
magenta pigment dispersion liquid J: 40 parts
self-dispersible polymer particles B-4: 8 parts (in terms of solid content)
glycerin (manufactured by Wako Pure Chemical Industries, Ltd.): 20 parts
diethylene glycol: 10 parts
(manufactured by Wako Pure Chemical Industries, Ltd.)
OLFINE E1010 (manufactured by Nissin Chemical Industry Co., Ltd.): 1 part
ion-exchanged water: remainder
(Ink Composition of Ink M-8)
magenta pigment dispersion liquid J: 40 parts
self-dispersible polymer particles B-5: 8 parts (in terms of solid content)
glycerin (manufactured by Wako Pure Chemical Industries, Ltd.): 20 parts
diethylene glycol: 10 parts
(manufactured by Wako Pure Chemical Industries, Ltd.)
OLFINE E1010 (manufactured by Nissin Chemical Industry Co., Ltd.): 1 part
ion-exchanged water: remainder
(Ink Composition of Ink M-9)
magenta pigment dispersion liquid J: 40 parts
self-dispersible polymer particles B-6: 8 parts (in terms of solid content)
glycerin (manufactured by Wako Pure Chemical Industries, Ltd.): 20 parts
diethylene glycol: 10 parts
(manufactured by Wako Pure Chemical Industries, Ltd.)
OLFINE E1010 (manufactured by Nissin Chemical Industry Co., Ltd.): 1 part
ion-exchanged water: remainder
(Ink Composition of Ink M-10)
magenta pigment dispersion liquid Q: 40 parts
self-dispersible polymer particles B-1: 8 parts (in terms of solid content)
glycerin (manufactured by Wako Pure Chemical Industries, Ltd.): 20 parts
diethylene glycol: 10 parts
(manufactured by Wako Pure Chemical Industries, Ltd.)
OLFINE E1010 (manufactured by Nissin Chemical Industry Co., Ltd.): 1 part
ion-exchanged water: remainder
(Ink Composition of Ink MH-1)
magenta pigment dispersion liquid J: 40 parts
self-dispersible polymer particles BH-1: 8 parts (in terms of solid content)
glycerin (manufactured by Wako Pure Chemical Industries, Ltd.): 20 parts
diethylene glycol: 10 parts
(manufactured by Wako Pure Chemical Industries, Ltd.)
OLFINE E1010 (manufactured by Nissin Chemical Industry Co., Ltd.): 1 part
ion-exchanged water: remainder
(Ink Composition of Ink MH-2)
magenta pigment dispersion liquid J: 40 parts
self-dispersible polymer particles BH-2: 8 parts (in terms of solid content)
glycerin (manufactured by Wako Pure Chemical Industries, Ltd.): 20 parts
diethylene glycol: 10 parts
(manufactured by Wako Pure Chemical Industries, Ltd.)
OLFINE E1010 (manufactured by Nissin Chemical Industry Co., Ltd.): 1 part
ion-exchanged water: remainder
(Ink Composition of Ink MH-3)
magenta pigment dispersion liquid M: 40 parts
self-dispersible polymer particles BH-3: 8 parts (in terms of solid content)
glycerin (manufactured by Wako Pure Chemical Industries, Ltd.): 20 parts
diethylene glycol: 10 parts
(manufactured by Wako Pure Chemical Industries, Ltd.)
OLFINE E1010 (manufactured by Nissin Chemical Industry Co., Ltd.): 1 part
ion-exchanged water: remainder
(Ink Composition of Ink MH-4)
magenta pigment dispersion liquid O: 40 parts
self-dispersible polymer particles BH-4: 8 parts (in terms of solid content)
glycerin (manufactured by Wako Pure Chemical Industries, Ltd.): 20 parts
diethylene glycol: 10 parts
(manufactured by Wako Pure Chemical Industries, Ltd.)
OLFINE E1010 (manufactured by Nissin Chemical Industry Co., Ltd.): 1 part
ion-exchanged water: remainder
(Ink Composition of Ink MH-5)
magenta pigment dispersion liquid Q: 40 parts self-dispersible polymer particles BH-5: 8 parts (in terms of solid content)

glycerin (manufactured by Wako Pure Chemical Industries, Ltd.): 20 parts diethylene glycol: 10 parts (manufactured by Wako Pure Chemical Industries, Ltd.)

OLFINE E1010 (manufactured by Nissin Chemical Industry Co., Ltd.): 1 part ion-exchanged water: remainder (Ink Composition of Ink MH-6)

magenta pigment dispersion liquid P: 40 parts self-dispersible polymer particles B-1: 8 parts (in terms of solid content)

glycerin (manufactured by Wako Pure Chemical Industries, Ltd.): 20 parts diethylene glycol: 10 parts (manufactured by Wako Pure Chemical Industries, Ltd.)

OLFINE E1010 (manufactured by Nissin Chemical Industry Co., Ltd.): 1 part ion-exchanged water: remainder

[Evaluation]

(Measurement of Viscosity, and Change of the Viscosity)

The viscosity was measured for an undiluted solution directly using DV-II+VISCOMETER manufactured by BROOKFIELD with a cone plate ($\phi$: 35 mm), and an average value of data when the torque was within the range from 20 to 95% and the rotation number was within the range from 10 to 100 rpm was determined as the measurement value. Table 3 shows the ink viscosity just after the preparation of the ink.

For evaluating the viscosity change, a viscosity A of a ink just after the preparation and a viscosity B of the ink after 90-day storage at room temperature were measured. An increasing ratio was calculated using a formula, (B−A)/A, which was used for the evaluation based on the evaluation criteria below.

Evaluation Criteria

3: the increasing ratio was 5% or less from the viscosity measured just after the preparation of the ink 2: the increasing ratio was more than 5% and 10% or less from the viscosity measured just after the preparation of the ink 1: the increasing ratio exceeded 10% from the viscosity measured just after the preparation of the ink (Measurement of Particle Diameter and Change of the Particle Diameter)

Regarding the particle diameter, each ink was diluted with ion-exchanged water 500 to 1000 times, and the diluted ink was used for measuring the volume average particle diameter Mv, using a particle size distribution-measuring apparatus NANOTRACK UPA-EX 150 manufactured by Nikkiso Co., Ltd., under the following conditions at 25° C.

particle permeability: permeation, particle figure: nonspherical shape, and particle density: 1.2.

Table 3 shows a particle diameter just after the preparation of the ink.

For evaluating a particle diameter-changing ratio, a particle diameter D1 of an ink just after the preparation and a particle diameter D2 of the ink after 90-day storage at room temperature were measured. An increasing ratio of the diameter of particles in the ink was calculated using a formula (D2−D1)/D1, which was used for the evaluation based on the evaluation criteria below.

Evaluation Criteria

3: the increasing ratio was 5% or less from the particle diameter measured just after the preparation of the ink 2: the increasing ratio was more than 5% and 10% or less from the particle diameter measured just after the preparation of the ink 1: the increasing ratio exceeded 10% from the particle diameter measured just after the preparation of the ink (Scratching Resistance Test)

The ink was refilled in a cartridge of GELJET G717 manufactured by Ricoh, which was used to print solid image on TOKUBISHI BOTH SIDE ART N (manufactured by Mitsubishi Paper Mills), and the printed sample was dried at room temperature for 24 hours or more. After the drying, the sample was left in a heating oven, PDR-3KP manufactured by ESPEC at 80° C. for additional 1 hour, and then left for 12 hours. The sample was used for evaluating scratching resistance.

The scratching resistance was evaluated as follows.

The sample obtained as described above was subjected to 10-time rubbing with a commercially available eraser (MONO, manufactured by TOMBO) with a load of 750 g. The peeling-off state was visually observed and evaluated based on the evaluation criteria below. Table 3 shows evaluation results.

Evaluation Criteria

3: no peeling-off was observed

2: slight peeling-off was recognized

1: Peeling-off was recognized partially and visibility also lowered (Evaluation of Gloss on Glossy Paper)

The ink was refilled in a cartridge of GELJET G717 manufactured by Ricoh, and was used for evaluating the gloss on a glossy paper being a glossy medium. The measurement of the gloss on glossy paper that is a glossy medium was performed using PM photo paper (manufactured by Seiko Epson) as a glossy paper. That is, printing was performed on the paper, thereby preparing a sample.

For the sample obtained by printing on the glossy paper, the gloss was measured. The mirror glossiness of the recorded surface at an incident angle of 60 degrees was measured with a gloss checker IG-320 (manufactured by Horiba), and a value obtained by averaging five measured values for every recording paper was adopted as the gloss on the glossy paper. Table 3 shows measurement results.

(Measurement of Optical Density (OD))

The ink was refilled in a cartridge of GELJET G717 manufactured by Ricoh, and was used for evaluating the optical density (OD) on regular paper being a non-glossy medium. The measurement of the optical density (OD) on regular paper was performed using Xerox 4024 paper (manufactured by Xerox Corporation, USA) as a regular paper. That is, printing was performed on the paper, thereby obtaining a sample.

For the above-described sample obtained by printing on the regular paper, the optical density (OD) was measured using a GRETAG MACBETH SPECTROSCAN SPM-50 (manufactured by GRETAG (USA)). Table 3 shows measurement results.

TABLE 3

| Recording liquid | Dispersion average particle diameter of magenta dispersion liquid (nm) | Self-dispersing polymer particle | Viscosity (mPa·s) | Particle diameter (nm) | Viscosity change over time | Particle diameter change over time | Scratching resistance | Regular paper OD | Glossy paper glossiness | Remarks |
|---|---|---|---|---|---|---|---|---|---|---|
| Ink M-1 | 30.5 | B-01 | 4.7 | 32.2 | 3 | 3 | 3 | 1.45 | 85 | Invention |
| Ink M-2 | 22.3 | B-01 | 4.8 | 29.8 | 3 | 3 | 3 | 1.47 | 86 | Invention |
| Ink M-3 | 31.4 | B-01 | 4.6 | 34.1 | 3 | 3 | 3 | 1.44 | 84 | Invention |
| Ink M-4 | 48.1 | B-01 | 4.5 | 45.8 | 3 | 3 | 2 | 1.40 | 80 | Invention |
| Ink M-5 | 30.5 | B-02 | 4.8 | 32.4 | 3 | 3 | 3 | 1.42 | 82 | Invention |
| Ink M-6 | 30.5 | B-03 | 4.7 | 31.5 | 3 | 3 | 3 | 1.42 | 82 | Invention |
| Ink M-7 | 30.5 | B-04 | 4.8 | 33.8 | 3 | 3 | 3 | 1.42 | 82 | Invention |
| Ink M-8 | 30.5 | B-05 | 4.6 | 35.2 | 3 | 3 | 3 | 1.41 | 81 | Invention |
| Ink M-9 | 30.5 | B-06 | 4.7 | 38.1 | 3 | 3 | 3 | 1.41 | 81 | Invention |
| Ink M-10 | 35.5 | B-01 | 5.1 | 40.3 | 2 | 2 | 3 | 1.40 | 80 | Invention |
| Ink MH-1 | 30.5 | BH-1 | 4.7 | 69.8 | 1 | 1 | 1 | 1.29 | 70 | Comparative |
| Ink MH-2 | 30.5 | BH-2 | 4.8 | 33.6 | 1 | 1 | 1 | 1.38 | 80 | Comparative |
| Ink MH-3 | 35.3 | BH-3 | 4.5 | 38.8 | 1 | 1 | 1 | 1.37 | 80 | Comparative |
| Ink MH-4 | 43.2 | BH-4 | 4.8 | 41.9 | 1 | 1 | 1 | 1.34 | 76 | Comparative |
| Ink MH-5 | 35.5 | BH-5 | 4.4 | 39.8 | 1 | 1 | 1 | 1.35 | 72 | Comparative |
| Ink MH-6 | 68.4 | B-01 | 4.5 | 70.1 | 2 | 2 | 1 | 1.21 | 70 | Comparative |

From Table 3, it is understood that the recording liquid of the invention shows a little change in the viscosity and the particle diameter caused by a lapse of time and thus has good stability of the ink. Further, it is understood that images recorded with the recording liquid of the invention are excellent in scratching resistance.

Further, it is understood that images printed on regular paper with the recording liquid of the invention have high optical density, and that, further, images printed on glossy paper have high gloss.

According to the invention, it is possible to provide a recording liquid that has good stability over time and a low viscosity and that is able to provide recorded images having excellent scratching resistance; and an ink set including the recording liquid, a method for recording an image and an image-recording apparatus using the recording liquid, and a printed matter recorded with the recording liquid.

Hereinafter, exemplary embodiments of the present invention will be described. However, the invention is not limited to the following exemplary embodiments.

<1> A recording liquid comprising:
particles A including a water-insoluble colorant and a compound containing a hydrophilic group, the particles A having a dispersion average particle diameter from 5 to 50 nm; and
self-dispersible polymer particles B including a constituent unit derived from an aromatic group-containing acrylate monomer.

<2> The recording liquid according to <1>, wherein the compound containing a hydrophilic group is a compound containing at least one hydrophilic group selected from the group consisting of a carboxyl group, a sulfonic acid group, a phosphoric acid group, hydroxyl group and an alkyleneoxide group.

<3> The recording liquid according to <1> or <2>, wherein the hydrophilic group is a carboxyl group.

<4> The recording liquid according to any one of <1> to <3>, wherein the self-dispersible polymer particles B comprise a constituent unit including a carboxyl group.

<5> The recording liquid according to <4>, wherein the self-dispersible polymer particles B have an acid value from 20 to 150 mg KOH/g.

<6> The recording liquid according to <4> or <5>, wherein the acid value of the self-dispersible polymer particles B is smaller than the acid value of the compound containing a hydrophilic group.

<7> The recording liquid according to any one of <1> to <6>, wherein the content ratio of the constituent unit derived from an aromatic group-containing acrylate monomer is from 10% by mass to 95% by mass.

<8> The recording liquid according any one of <1> to <7>, wherein the aromatic group-containing acrylate monomer is phenoxyethyl acrylate.

<9> The recording liquid according to any one of <1> to <8>, wherein the self-dispersible polymer particles B have a dispersion average particle diameter from 1 to 50 nm.

<10> An ink set comprising the recording liquid according to any one of <1> to <9>.

<11> A method for recording an image, the method comprising ejecting the recording liquid according to any one of <1> to <9> by an ink-jet method to record an image.

<12> A method for recording an image, the method comprising ejecting a recording liquid of the ink set according to <10> by an ink-jet method to record an image.

<13> An image-recording apparatus including an ejection unit that ejects the recording liquid according to any one of <1> to <9> by an ink-jet method.

<14> An image-recording apparatus including an ejection unit that ejects the recording liquid of the recording set according to <10> by an ink-jet method.

<15> A recorded matter recorded with the recording liquid according to any one of <1> to <9>.

<16> A recorded matter recorded with the ink set according to <10>.

All publications, patent applications, and technical standards mentioned in this specification were herein incorporated by reference to the same extent as if each individual publication, patent application, or technical standard was specifically and individually indicated to be incorporated by reference.

What is claimed is:

1. A recording liquid comprising:
   particles A including a water-insoluble colorant and a compound containing a hydrophilic group, the particles A having a dispersion average particle diameter from 5 to 50 nm and the compound containing a hydrophilic group being a polymer dispersant; and
   self-dispersible polymer particles B including a constituent unit derived from an aromatic group-containing acrylate monomer, wherein the compound containing a hydrophilic group has an acid value, and the self-dispersible polymer particles B have an acid value, and
   wherein the acid value of the self-dispersible polymer particles B is smaller than the acid value of the compound containing a hydrophilic group.

2. The recording liquid according to claim 1, wherein the compound containing a hydrophilic group is a compound containing at least one hydrophilic group selected from the group consisting of a carboxyl group, a sulfonic acid group, and a phosphoric acid group.

3. The recording liquid according to claim 1, wherein the hydrophilic group is a carboxyl group.

4. The recording liquid according to claim 1, wherein the self-dispersible polymer particles B comprise a constituent unit including a carboxyl group.

5. The recording liquid according to claim 4, wherein the self-dispersible polymer particles B have an acid value from 20 to 150 mg KOH/g.

6. The recording liquid according to claim 1, wherein the content ratio of the constituent unit derived from an aromatic group-containing acrylate monomer is from 10% by mass to 95% by mass.

7. The recording liquid according to claim 1, wherein the aromatic group-containing acrylate monomer is phenoxyethyl acrylate.

8. The recording liquid according to claim 1, wherein the self-dispersible polymer particles B have a dispersion average particle diameter from 1 to 50 nm.

9. An ink set comprising a recording liquid, wherein the recording liquid comprises:
   particles A including a water-insoluble colorant and a compound containing a hydrophilic group, the particles A having a dispersion average particle diameter from 5 to 50 nm and the compound containing a hydrophilic group being a polymer dispersant; and
   self-dispersible polymer particles B including a constituent unit derived from an aromatic group-containing acrylate monomer,
   wherein the compound containing a hydrophilic group has an acid value, and the self-dispersible polymer particles B have an acid value, and
   wherein the acid value of the self-dispersible polymer particles B is smaller than the acid value of the compound containing a hydrophilic group.

* * * * *